(12) United States Patent
Nakao et al.

(10) Patent No.: US 6,505,670 B2
(45) Date of Patent: Jan. 14, 2003

(54) METHOD FOR INJECTION MOLDING METALLIC MATERIALS

(75) Inventors: Yasuhiro Nakao, Sayama (JP); Hiroto Shoji, Sayama (JP); Kunitoshi Sugaya, Sayama (JP); Takashi Kato, Sayama (JP); Takaharu Echigo, Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/902,398

(22) Filed: Jul. 10, 2001

(65) Prior Publication Data

US 2002/0020510 A1 Feb. 21, 2002

(30) Foreign Application Priority Data

| Jul. 11, 2000 | (JP) | ......................................... | 2000-210507 |
| Aug. 8, 2000 | (JP) | ......................................... | 2000-240180 |
| Aug. 8, 2000 | (JP) | ......................................... | 2000-240299 |

(51) Int. Cl.[7] .............................................. B22D 17/12
(52) U.S. Cl. ........................................... 164/5; 164/113
(58) Field of Search ..................................... 164/113, 5

(56) References Cited

FOREIGN PATENT DOCUMENTS

DE         198 00 593 A1       7/1999

*Primary Examiner*—Kuang Y. Lin
(74) *Attorney, Agent, or Firm*—Merchant & Gould, P.C.

(57) ABSTRACT

A method for injection molding a metallic material is disclosed in which an injecting material comprised of a half-solidified metallic material and a molten metallic material is injected into a cavity of a die from an injection cylinder through a gate thereof. A non-product portion remaining at the gate of the die is separated from a product portion while it is still hot. The separated high-temperature non-product portion is press-formed into a billet in the injection cylinder. Utilization of heat from the injecting material in melting the high-temperature billet enables reuse of the non-product portion remained at the gate and reduction of heat energy required in melting the billet.

5 Claims, 26 Drawing Sheets

COMPARATIVE EXAMPLE

PREFERRED EMBODIMENT

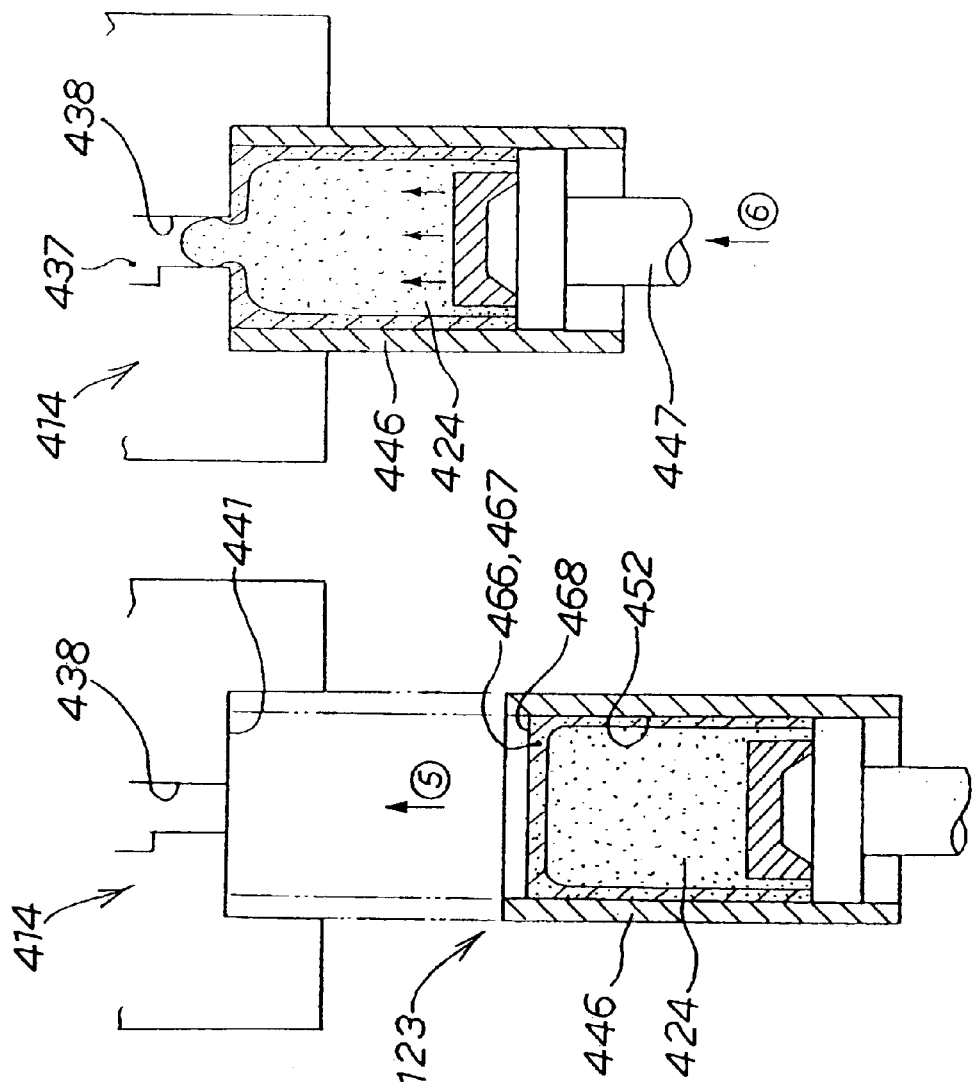

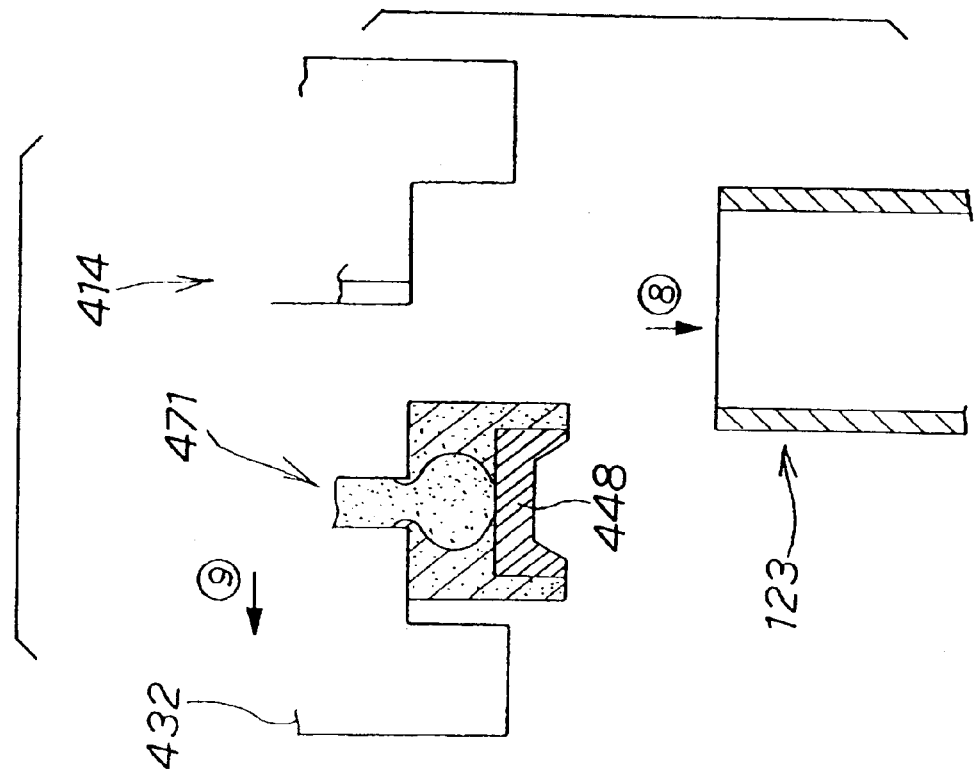
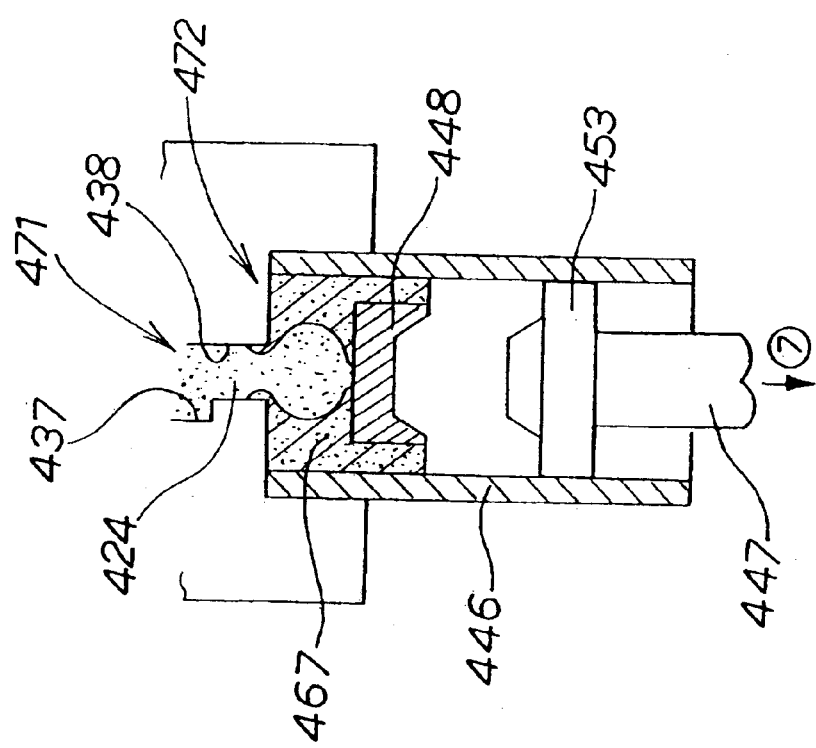

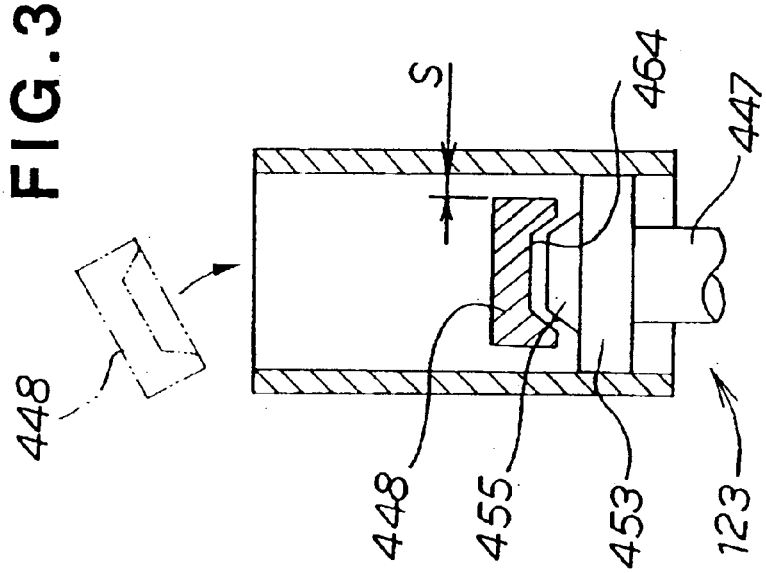
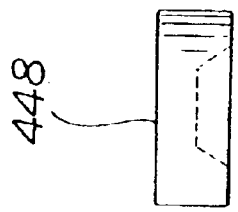
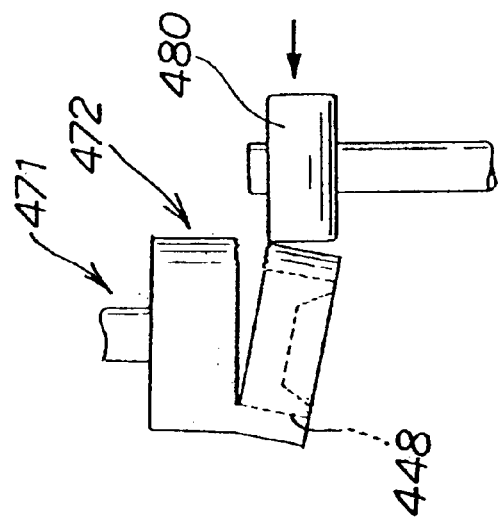

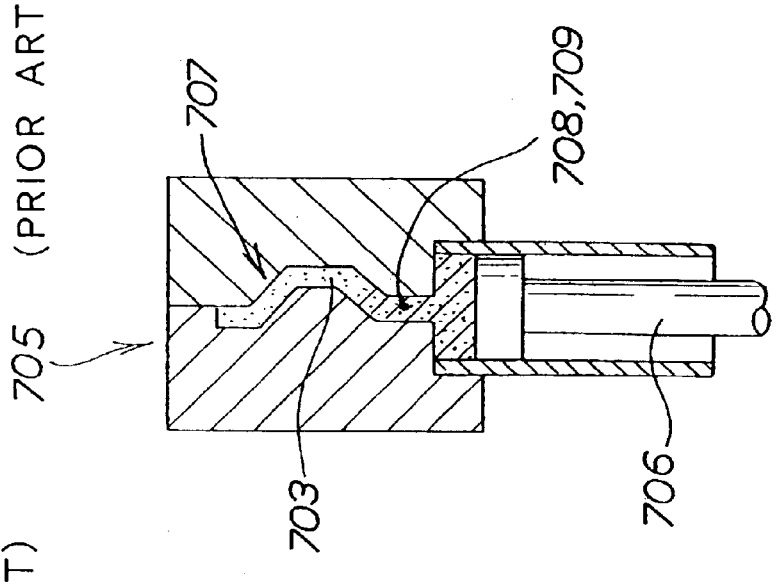
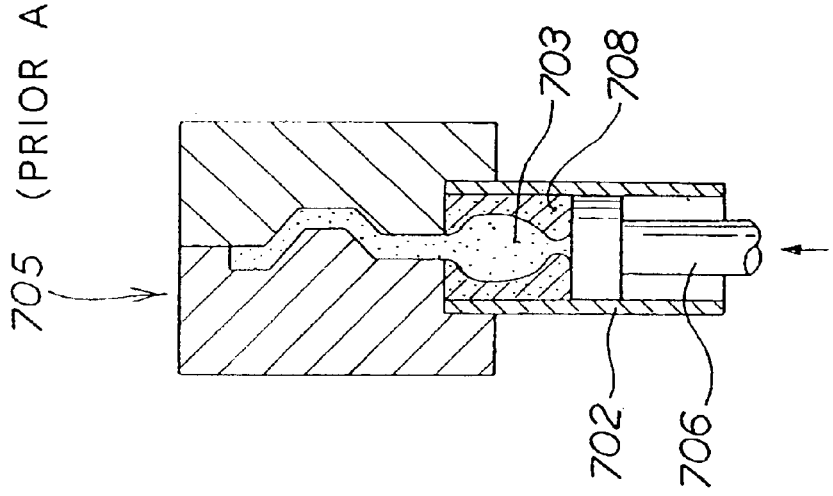
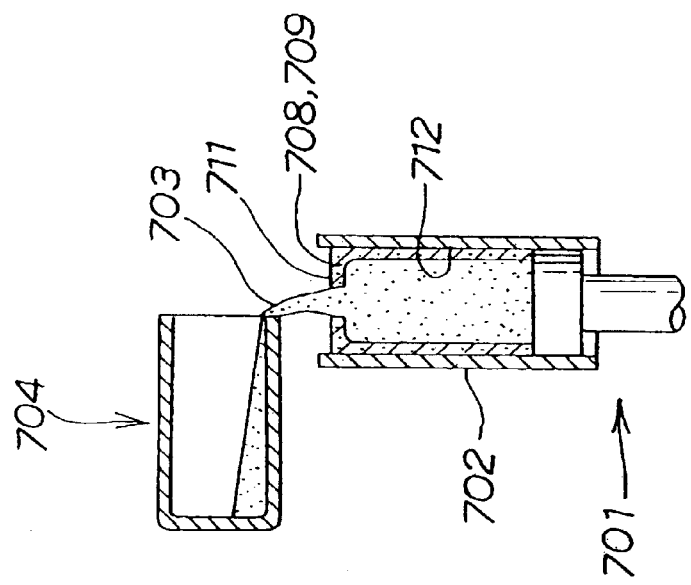

METHOD FOR INJECTION MOLDING METALLIC MATERIALS

BACKGROUND OF THE INVENTION

1. Field of the Invention

The present invention relates to a method for injection molding metallic materials to obtain a product of desired configuration by supplying a metallic material contained in an injection cylinder into a mold cavity.

2. Description of the Related Art

A typical example of known disk brakes for motor vehicles is shown in cross section in FIG. 32 hereof. As shown in FIG. 32, a disk rotor 503 of the example disk brake 502 is mounted to a drive shaft 500 via a hub 501. A peripheral portion of the disk rotor 503 is placed in a caliper 506.

A wheel 509 is braked by transmitting an oil pressure from a feed flow path 508 to a cylinder, not shown, of the caliper 506 and pressing brake pads 507, 507 onto a disk portion 505 of the disk rotor 503.

Since the brake pads 507, 507 are pressed hard onto the disk portion 505 of the disk rotor 503, the disk rotor 503 is required to be formed of a high-strength material.

On the other hand, in order to reduce the total weight of a motor vehicle, the disk rotor 503 is preferably manufactured of a lightweight material.

Metal matrix composite material (MMC) materials are well known for their high strength and lightweight. For example, employing aluminum (Al) alloy as a metal matrix can save the weight, and adding silicon carbide (SiC) to Al alloy matrix can realize increase in strength.

A method for manufacturing the disk rotor 503 from an Al alloy matrix composite material will now be described with reference to FIG. 34 hereof.

Such a method is carried out in a conventional apparatus for injection molding a metal matrix composite material. An injection cylinder 515 is brought into communication with a cavity 512 defined by a movable die 510 and a stationary die 511 via a gate 513. A plunger 516 is mounted to the injection cylinder 515 so as to be capable of upward and downward movements, an MMC feeding means 518 is connected to the injection cylinder 515 via a feed path 517, and a shut-off valve 519 is mounted to an exit side of the feed path 517.

A shut-off valve 519 is opened and an AL alloy matrix composite material is fed from the MMC feeding means 518 into the injection cylinder 515 as shown by arrow a. The plunger 516 is moved upward as shown by arrow b, and Al alloy matrix composite material is filled into the cavity 512 through the gate 513. Then, the movable die 510 is moved upward as shown by the arrow c to open the die and the cast product is taken out of the die. The cast product taken out will be described below.

Reference is made next to FIG. 34 showing a cast product taken out from the die. The cast product 520 is cut into a product portion 521 and a non-product portion 522.

The product portion 521 is a member formed of Al alloy matrix composite material molded in the cavity 512 and is to be processed to obtain the disk rotor 503 as shown in FIG. 32.

The non-product portion 522 is a member formed of Al alloy matrix composite material remained at the gate 513 (See FIG. 33).

The non-product portion 522 remained at the gate 513 is also of Al alloy matrix composite material obtained by adding SiC grains to Al alloy matrix. Therefore, since Al alloy matrix composite material cannot be reused as it is, it is necessary to separate SiC grains from Al alloy matrix in order to reuse it. However, such separation is technically difficult, and if possible, it costs much. Therefore, the non-product portion 522 is put on a shelf in the existing circumstances and this contributes to increase in the cost of the product portion 521 molded by Al alloy matrix composite material (or a metallic material).

On the other hand, there are products that do not require high strength among injection molded articles. Since such products are not required to contain SiC grains for increasing strength, they may be formed of normal aluminum alloy material (or a metallic material) by injection molding. Therefore, there is a tendency that they are considered to be easily reusable because it is not necessary to separate SiC grains as in the case of Al alloy matrix composite material when reusing the non-product remained at the gate.

However, in order to reuse the non-product portion as a molten material in subsequent injection molding, it is necessary to melt the non-product portion, which requires much heat energy for melting the non-product portion. Therefore, in the existing circumstances, the non-product portion is shelved, thereby contributing to increase in cost of the product molded of Al alloy material (metallic material).

FIG. 35 shows a conventional injection molding apparatus. The injection molding apparatus 600 includes an injection apparatus 601 opposed to a die 602. A molten metallic material 605 is poured into a cavity 604 through a gate 603. When the molten material 605 is solidified in the cavity 604, a disk rotor 608 for the disk brake is obtained.

FIG. 36 shows an example disk rotor including casting defects. The disk rotor 608 is a defective apparatus having a defect that is appeared on an opposite side of the gate 603 (See FIG. 35) as a boundary of imperfect integrity at the joint due to lowering of the temperature of the molten material, that is, cold shuts 606 and scabs 607. In other words, referring to FIG. 35, when the molten material 605 is injected into the cavity 604 through the gate 603 upwardly at the lower portion and then the molten material 605 collides against the upper portion of the cavity 604, the cold shuts 606 and scabs 607 are generated.

Referring now to FIG. 37A to FIG. 37C, a conventional injection apparatus will be described.

In FIG. 37A, a molten metal matrix composite material 703 is fed from the molten material feeding apparatus 704 into the injection cylinder 702 of the injecting apparatus 701.

In FIG. 37B, the injection cylinder 702 is connected to the forming die 705. The molten material 703 is injected into the cavity of the forming die 705 by the plunger 706 moving up and down in the injection cylinder 702, as shown by the arrow.

In FIG. 37C, the plunger 706 moves to the upper limit and injecting operation terminates. After that, when the injected molten material 703 is solidified in the forming die 705, and the cast product 707 is completed.

However, slugs 708 may enter into the cast product 707, which is a defect of the cast product. The slug 708 is a residue 709 generated by the oxide of the molten material 703 of metal matrix composite material, and is generated on the surface layer portion 711 of the molten material 703 and may adhere to the inner wall surface 712 of the injection cylinder 702. The adhered residue 709 causes a defect on the cast product 707 by being mixed in the molten material 703. When the defect is developed, the cast product has to be disposed, which leads to lowering of manufacturing efficiency.

SUMMARY OF THE INVENTION

It is therefore a first object of the present invention to enable the reuse of the non-product portion remained at the gate to bring down costs for injection-molded articles formed of metallic material.

A second object of the present invention is to provide an injection apparatus for metal matrix composite material that can eliminate defects of cast product caused by residues.

According to a first aspect of the present invention, there is provided a method for injection molding a metallic material in which an injecting material comprised of a half-solidified metallic material or a molten metallic material is injected into a cavity of a die from an injection cylinder through a gate thereof, the method comprising the steps of: taking out a cast product from the die while the cast product is still hot, the cast product having a product portion molded in the cavity and a non-product portion remaining at the gate; separating the non-product portion from the cast product while the non-product portion is in a state of high temperature; shaping the high-temperature non-product portion into a billet; putting the billet into the injection cylinder; and filling the injecting material into the injection cylinder to cause the billet to melt into the injecting material to thereby ready the billet for a succeeding injection cycle.

In other words, in the first invention, the non-product portion is shaped into a billet of high temperature, and the billet is melted in the injection cylinder by the use of heat from the injecting material. By utilizing heat from the injecting material for melting the billet, heat energy required to melt the billet can be reduced. In addition, since the billet is melted while it is in the state of high temperature, heat energy can further be saved. Therefore, the non-product portion remained at the gate can be reused without laying the non-product portion on the shelf.

Preferably, the step of taking out is carried out while the cast product is held at a temperature of 400 to 100° C. In this temperature range, the cast product is half-solidified sot that it can be taken out from the die easily, but has heat that can be utilized as heat energy in melting the billet.

As an injecting material, for example, a metallic material in a half-solidified state and a metal matrix composite material in a molten state are prepared. The respective materials are filled into the injection cylinder such that the metallic material comes to the plunger side of the injection cylinder, and the metal matrix composite material comes to the gate side, so that they can be poured into the cavity in the order of the metal matrix composite material and the metallic material.

It is preferable to inject materials into the cavity in the sequence of the metal matrix composite material and the metallic material, because the metal matrix composite material is filled into the cavity and the metallic material remains at the gate. It is thus not necessary to separate a reinforcing material such as SiC grains from the metal matrix composite material when reusing the non-product portion remained at the gate.

Desirably, the high-temperature non-product portion is placed in the injection cylinder and the non-product portion is press-formed into a billet in the injection cylinder to thereby reduce expenses in pressurizing equipment by effective use of the injection cylinder and the plunger.

In addition, the inventors have found through researches to prevent generation of cold shuts and scabs that such cold shuts and scabs are generated mainly by the fact that the molten material gets cooled at the portion of the cavity remote from the entrance. Therefore, in order to make the molten material resist getting cooled, the inventors have succeeded in obtaining robust cast products for disk brakes by increasing the volume of the molten material contained in the part of the cavity remote from the entrance, and maintaining the temperature of the molten material flowing at the distance almost constant.

According to a second aspect of the present invention, there is provided an apparatus for molding a disk rotor including a disk-shaped brake ring portion, a cylindrical hub portion formed integrally with the brake ring portion and projecting a predetermined distance in one sideward direction, and a lid portion formed integrally with a top end of the hub portion, the apparatus comprising: a forming die including a stationary die and a movable die defining a cavity therebetween, the forming die being positioned such that that portion of the cavity for forming the brake ring portion and that portion of the cavity for forming the lid portion are arranged vertically; and the cavity portion for forming the brake ring portion having an overflow portion for increasing a volume of the cavity on an upper part thereof so that when a molten metal matrix composite material is poured into the cavity upwardly from below, the molten composite material flows into the overflow portion past said cavity portion.

In this molding apparatus, the molten metal matrix composite material is injected upwardly from below. Therefore, in the case of cavities for molding disk rotors, the molten material goes into the die from below, separates once to the left and the right, and joins again at the upper portion. Since the cavity has the overflow portion formed at the upper portion thereof for the brake ring portion, the volume of the cavity is increased by the overflow portion, and thus the amount of the molten material at the upper portion increases. As a consequence, the temperature of the top end of the molten material resists lowering, and thus cold shuts and scabs on the cast product of a disc rotor can be prevented from occurring when they are joined at the upper portion.

In a preferred form, the overflow portion is provided in opposed relation to one surface of the brake ring portion. This causes the volume of the overflow portion to be increased so that the molten material can easily be forced into the cavity.

The overflow portion may comprise one or more recesses extending radially from a center of the brake ring portion in the form of a groove. As a result, the inlet port of the overflow portion can be formed between the center side and the outer edge, and thus the volume of the contained molten material may be increased while reducing resistance applied when flowing into the overflow portion.

According to a third aspect of the present invention, there is provided an injection apparatus including a forming die into which a molten metal matrix composite material is poured upwardly from below, the apparatus comprising: an injection cylinder provided vertically; a plunger disposed vertically movably within the injection; a block extending upwardly from a top end of the plunger and having an outer diameter smaller than an inner diameter of the injection cylinder, the injection cylinder having an inner wall surface defining, jointly with an outer peripheral surface of the block, a clearance for accommodating a residue of the molten metal matrix composite material.

In this arrangement, since the block is not brought into contact with the residue attached on the inner wall of the injection cylinder, the block does not scrape off the residue. Therefore, when injecting the molten material, the block can push out the central portion of the molten material that is free of the residue ahead of other portions, and thus the residue can be prevented from getting mixed into the molten material.

The block may be detachably secured to the plunger. More specifically, the plunger may be formed with a projection on the head portion thereof, while the block is formed with a recess on the lower surface thereof, so that the projection of the plunger can be detachably fitted in the recess of the block. As a result, the positioning and mounting of the block with respect to the plunger do not take a lot of trouble.

It is desirable that the block is formed of a material harder than the metal matrix composite material after it is solidified. In this arrangement, even when an impact is applied by a hammer or the like to the portion of the cast product corresponding to the gate in order to take out the block adhered to the portion of the solidified cast product corresponding to the gate after injection is terminated, the block in the cast product is free from deformation and scratches, whereby the block can be reused.

BRIEF DESCRIPTION OF THE DRAWINGS

Certain preferred embodiments of the present invention will be described in more detail below, by way of example only, with reference to the accompanying drawings, in which:

FIG. 31A to FIG. 31H are views showing an operation of the injection apparatus shown in FIG. 30;

FIG. 37A to FIG. 37C are explanatory views showing an operation of a conventional injection apparatus.

DETAILED DESCRIPTION OF THE PREFERRED EMBODIMENTS

The following description is merely exemplary in nature and is in no way intended to limit the invention, its application or uses.

Figure 1:
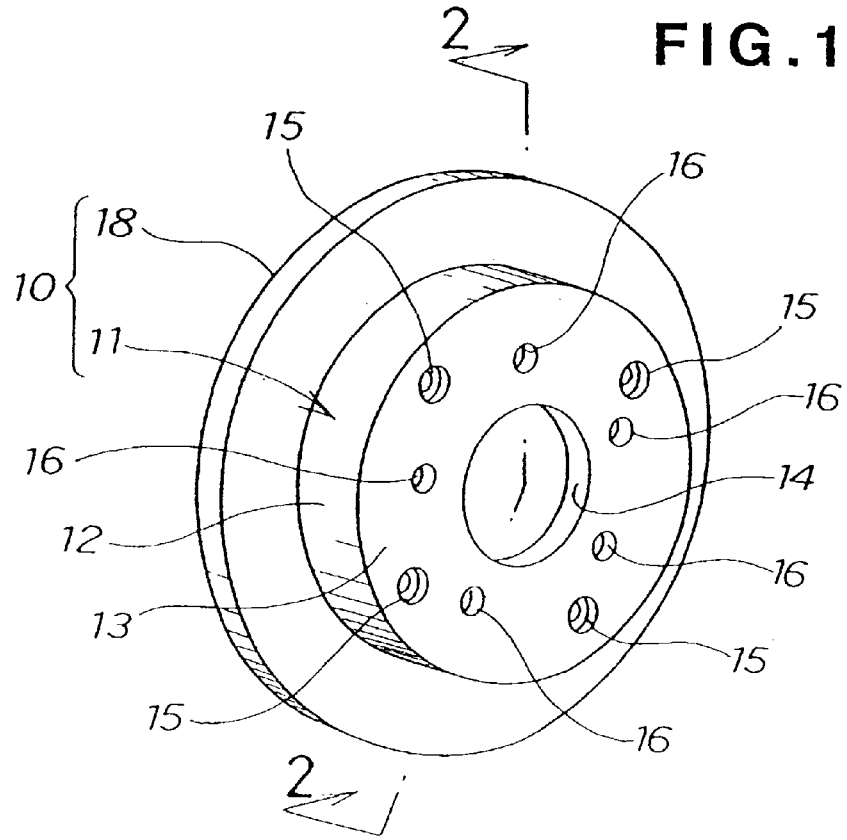
FIG. 1 is a perspective view of a disk rotor manufactured by a method of injection-molding metal material according to a first embodiment of the present invention.

As shown in FIG. 1, a disk rotor 10 comprises a cylindrical hub portion 11 and a disk-shaped disk portion 18 integrally molded with the hub portion 11. A hub portion 11 comprises a lid 13 integrally molded on the outer end of the peripheral wall 12, an opening 14 formed at the center of the lid 13, and a plurality of bolt holes 15 and a plurality of stud holes 16 formed around the opening 14. The bolts (not shown) are inserted through a plurality of bolt holes 15 so that the disk rotor 10 is secured to the drive shaft (not shown) with these bolts. The stud holes 16 are used for press-fitting studs (not shown) for mounting a wheel on the disk rotor 10.

A disk portion 18 faces toward the brake pad of the caliper (not shown) on which the brake pads are pressed against from both sides. Therefore, the disk portion 18 is required to have high strength and to be superior in abrasion resistance.

Figure 2:
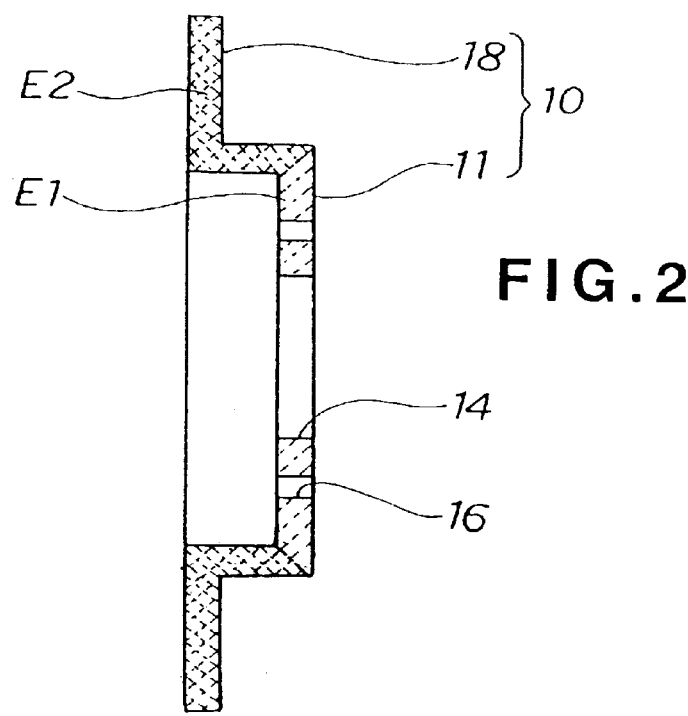
FIG. 2 is a cross sectional view taken along line 2—2 of FIG. 1.

As shown in FIG. 2, since the hub portion 11 is a portion to be mounted to the drive shaft, it is not required to have high strength and to be superior in abrasion resistance as much as it is for the disk portion 18. Therefore, the hub portion 11 is constructed of Al alloy matrix composite material impregnated with Al alloy. In FIG. 2, the area E1 of Al alloy matrix composite material impregnated with Al alloy is marked with diagonal lines.

The disk portion 18 is required to have high strength and to be superior in abrasion resistance since the brake pads are pressed against from both sides. Therefore, the disk portion is constructed only of Al alloy matrix composite material. In FIG. 2, the area E2 of Al alloy matrix composite material is reticulated.

Figure 3:
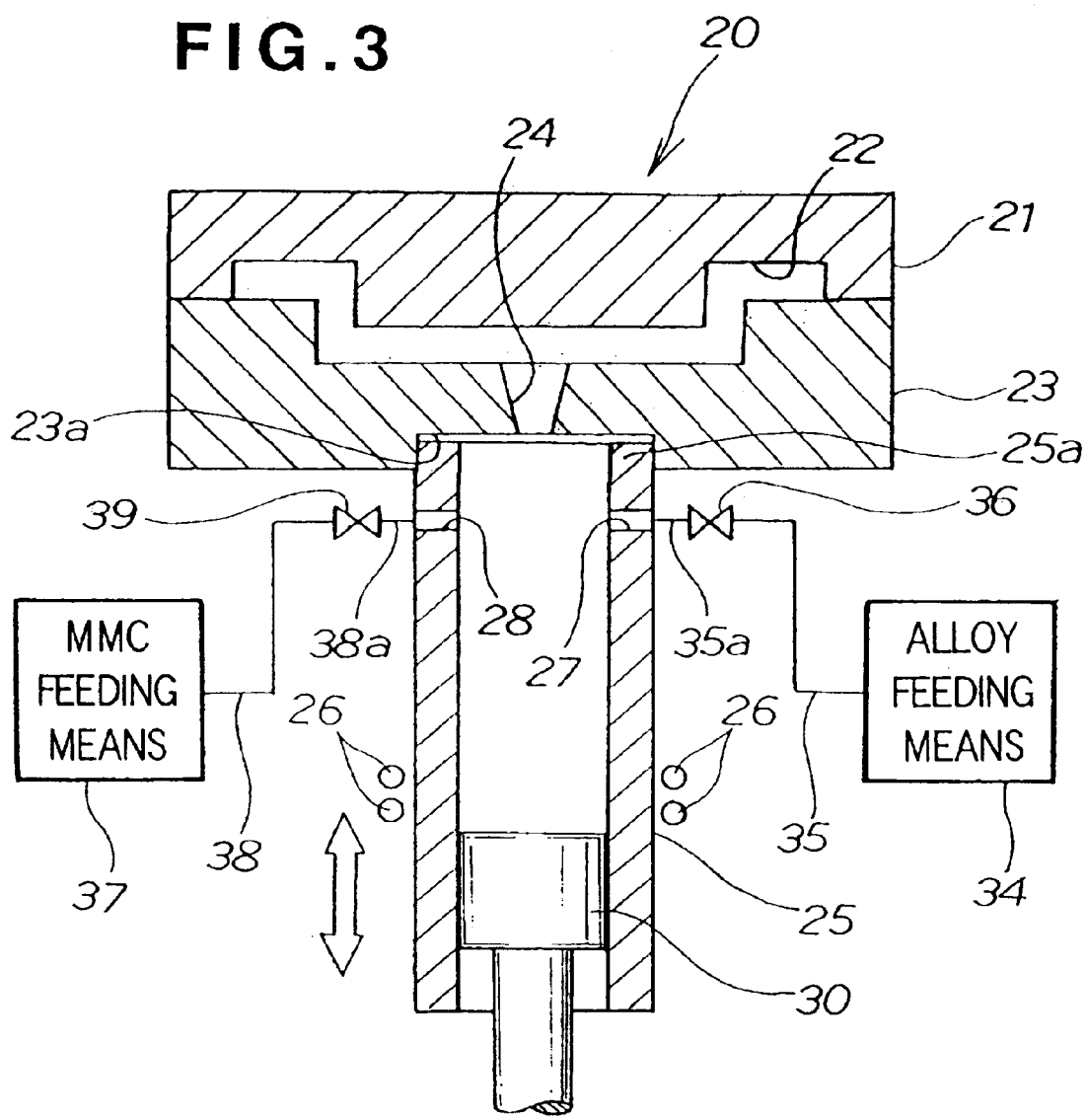
FIG. 3 is a cross sectional view of a injection molding apparatus for metal materials, according to the present invention.

The injection molding apparatus for carrying out a method of injection molding according to the present invention is shown in FIG. 3. The injection molding apparatus 20 for a metallic material, shown in FIG. 3, comprises a movable die 21 being capable of upward and downward movement; a stationary die 23 forming a cavity 22 with the movable die 21; an injection cylinder 25 mounted on the stationary die 23; Al metal feeding means 34 for feeding Al alloy into the injection cylinder 25; and MMC feeding means 37 for feeding Al alloy matrix composite material in the injection cylinder 25. The injection cylinder 25 has a plunger 30 moving upward and downward therein. The Al alloy feeding means 34 is connected to the injection cylinder 25 via the Al alloy feed path 35. The Al alloy feed path 35 has a shut-off valve for Al alloy 36 on the exit side 35a thereof. The MMC feeding means 37 is connected to the injection cylinder 25 via the MMC feed path 38. The MMC feed path 38 has a shutoff valve for MMC 39 on the exit side 38a thereof.

The stationary die 23 comprises a gate 24 that brings the cavity 22 and the inside of the injection cylinder 25 into communication.

The injection cylinder 25 comprises a heater 26 on the outer periphery near the upper end with the plunger 30 located at the lower position. The top end 25a of the injection cylinder 25 is fitted in the recess 23a formed on the lower end portion of the stationary die 23 so that the gate 24 of the stationary die 23 and the inside of the injection cylinder 25 are brought into communication with each other. The injection cylinder 25 may be removed from the stationary die 23 by pulling the top end 25a out from the recessed portion 23a.

The plunger 30 is provided in the injection cylinder 25 so as to be capable of reciprocating motion for forcing Al alloy matrix composite material or Al alloy in the injection cylinder 25 through the gate 24 into the cavity 22.

The Al alloy feeding means 34 feed Al alloy in the half-solidified state through the Al alloy feeding port 27 of the injection cylinder 25 into the injection cylinder 25 with the shut-off valve 36 for Al alloy opened.

The MMC feeding means 37 feeds Al alloy matrix composite material in the molten state through the MMC feeding port 28 of the injection cylinder 25 to the inside of the injection cylinder 25 with the shut-off valve 39 for MMC opened.

Referring now to FIG. 4 to FIG. 16, a method of injector-molding metal matrix composite material according to the first embodiment will be described. In these figures, the shut-off valve 36 for Al alloy and the shut-off valve 39 for MMC are blacked out when it is in the "closed" state.

Figure 4:
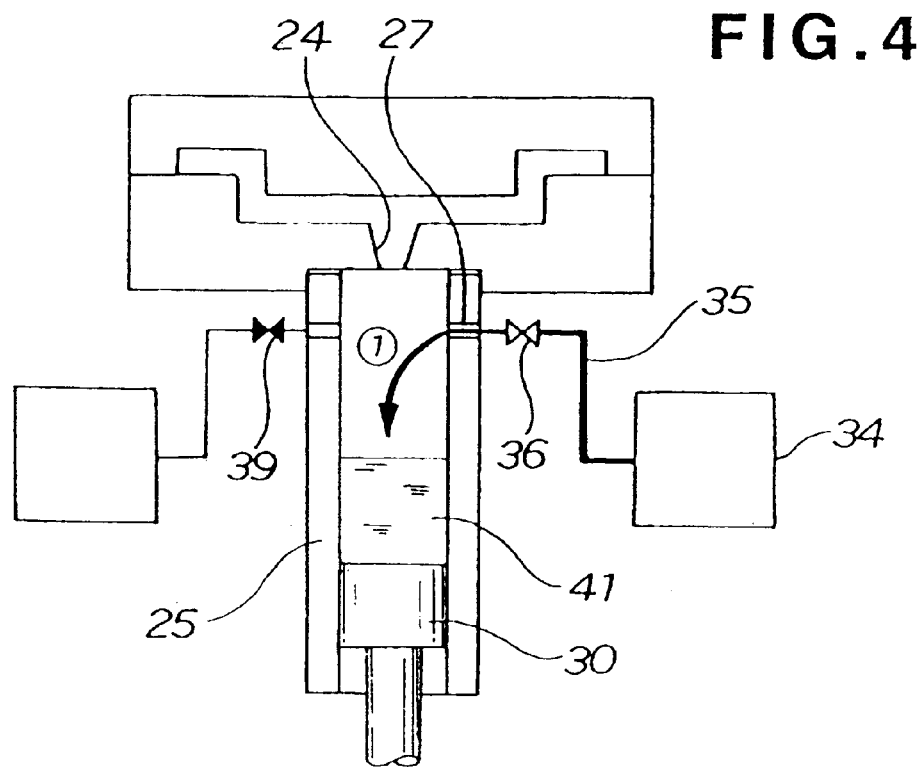
FIG. 4 to FIG. 14 are explanatory views showing a method of injection-molding metallic material, according to the first embodiment of the present invention.

In FIG. 4, Al alloy 41 in the half-solidified state is fed into the injection cylinder 25 through the Al alloy feeding port 27 by the Al alloy feeding means 34 as shown by the arrow (1) with the shut-off valve 39 for MMC closed and the shut-off valve for Al alloy 36 opened to fill Al alloy 41 in the half-solidified state on the plunger 30. The filling amount of Al alloy 41 will be described in conjunction with FIG. 7.

Figure 5:
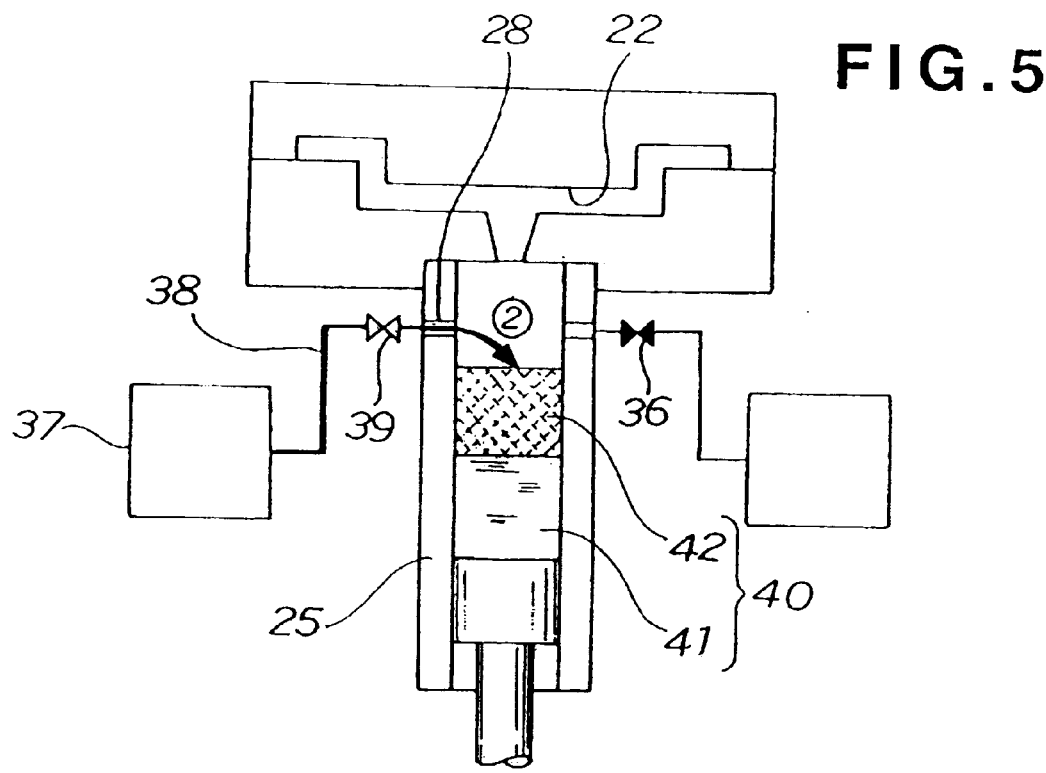

In FIG. 5, Al alloy matrix composite material 42 in the molten state is fed into the injection cylinder 25 via the MMC feeding port 28 by the MMC feeding means 37 as shown by the arrow (2) with the shut-off valve for Al alloy 36 closed and the shut-off valve for MMC 39 opened.

Then, an injecting material 40 including Al alloy in the half-solidified state (half-solidified metallic material) 41 and Al alloy matrix composite material in a molten state (molten metallic material) 42 is filled in the injection cylinder 25. The filling amount of metal matrix composite material 42 will be described in conjunction with FIG. 7.

Making Al alloy 41 in the half-solidified state and Al alloy matrix composite material 42 in the molten state, Al alloy matrix composite material 42 may be filled on Al alloy 41 in the separated state.

Figure 6:
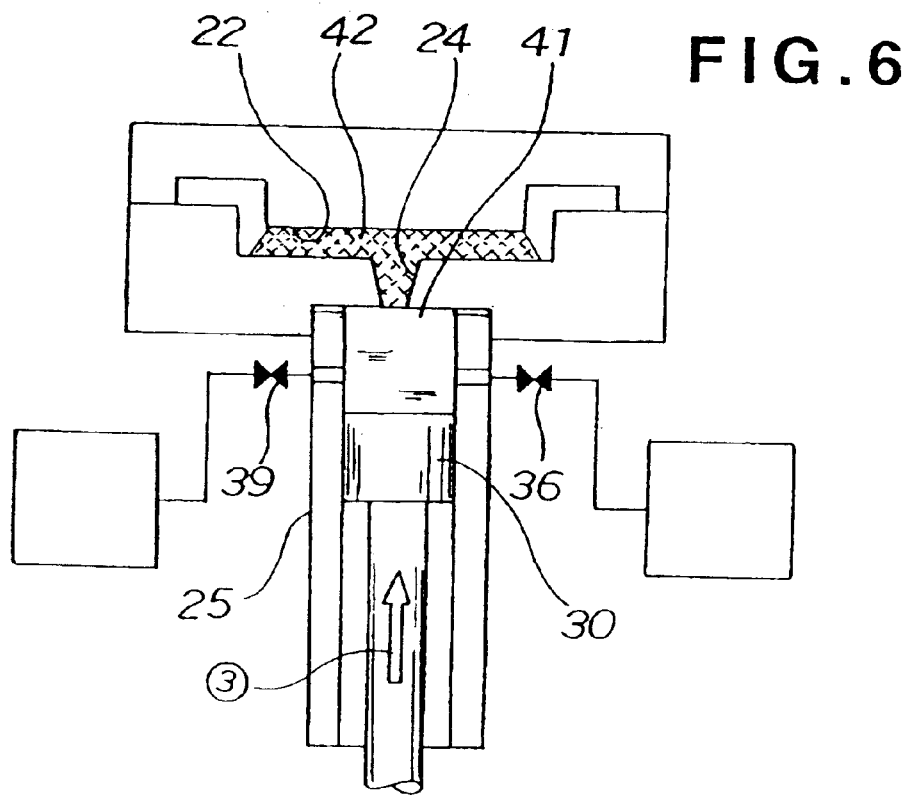

In FIG. 6, after the shut-off valve for MMC 39 is closed, the plunger 30 is moved upward as shown by the arrow (3) by the operating means (not shown). Then, Al alloy 41 in the half-solidified state moves upward and Al alloy matrix composite material 42 in the molten state is fed through the gate 24 into the cavity 22.

Figure 7:
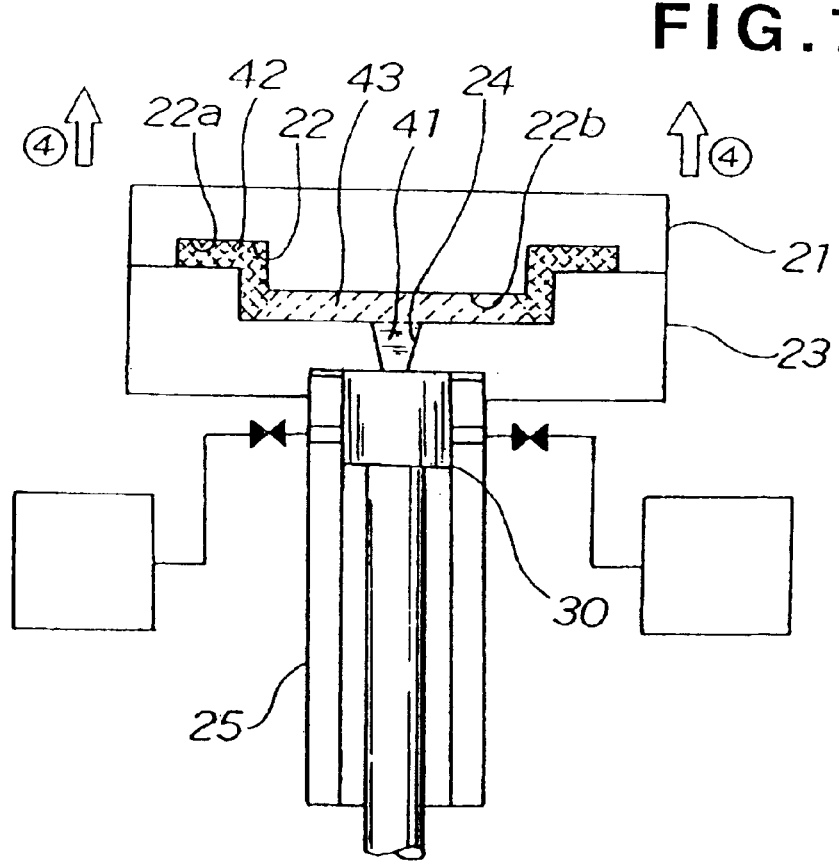

In FIG. 7, the plunger 30 is moved until it reaches the lower surface of the stationary die 23. Al alloy matrix composite material 42 in the molten state is filled into the disk portion forming portion 22a of the cavity 22 by filling Al alloy 41 in the half-solidified state in the gate 24. The area filled with Al alloy matrix composite material 42 is reticulated and the area corresponds to the area E2 shown in FIG. 2. Here, the filling amount of metal matrix composite material 42 explained in FIG. 5 is almost the same amount of the reticulated area. The filling amount of metal matrix composite material 42 may be changed as needed.

On the other hand, a part of Al alloy 41 goes into the cavity 22 through the gate 24 and thus Al alloy matrix composite material 42 is impregnated with Al alloy 41. The area 43 of Al alloy matrix composite material 42 impregnated with Al alloy 41 is marked with diagonal lines, and this area corresponds to E1 of FIG. 2. Here, the filling amount of Al alloy 41 described in conjunction with FIG. 4 is almost the same amount with the area 43 marked with diagonal lines added with the area of the gate 24. The filling amount of Al alloy 41 may be changed as needed.

As a next step, the movable die 21 is moved upward as shown by the arrow (4) to open the die.

Figure 8:
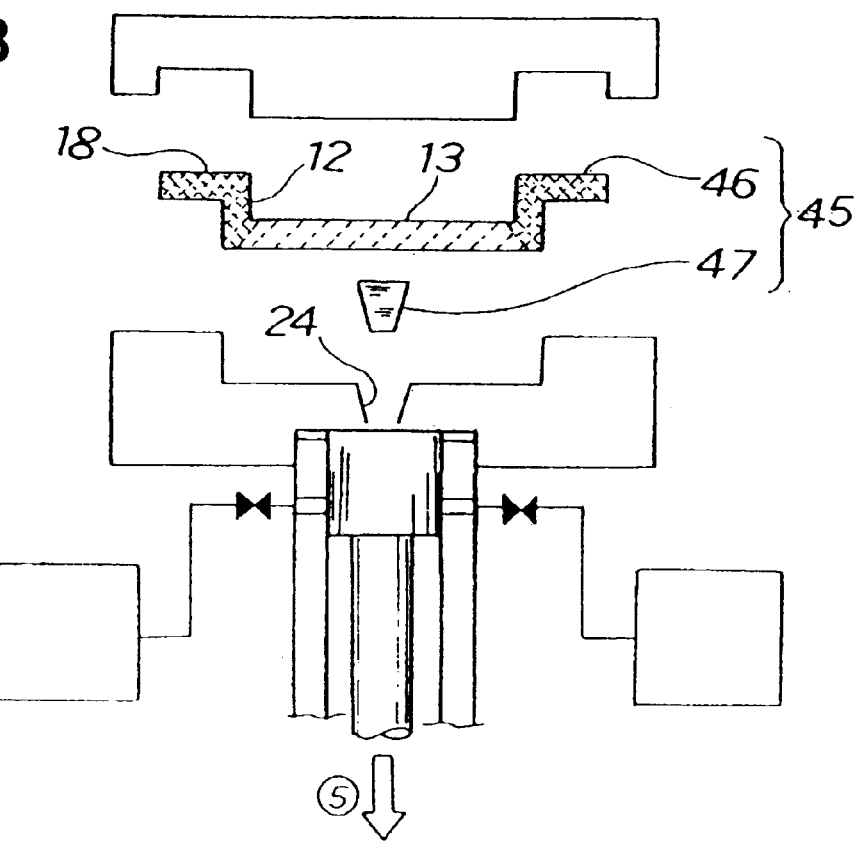

In FIG. 8, the cast product 45 including the product portion 46 molded in the cavity 22 and the non-product portion 47 remained at the gate 24 is taken out from the opened die while it is still hot (as an example, 400 to 100° C., or the temperature slightly lower than the solidifying temperature). When the temperature of the cast product 45 exceeds 400° C., there is a possibility that the cast product 45 cannot be taken out from the die in the solidified state. On the other hand, when the temperature of the cast product 45 is lower than 100° C., a large amount of heat energy is required when melting the non-product portion 47, which is not preferable. Therefore, the temperature of the cast product 45 is determined to be 400 to 100° C., so that heat energy required when melting the non-product portion 47 is reduced and that the cast product 45 can be taken out from the die in the solidified state.

As a next step, the non-product portion 47 is separated in high-temperature state from the cast product 45 taken out from the die to obtain the product portion 46. The product portion 46 is processed to obtain the disk rotor 10 shown in FIG. 2. The plunger 30 moves downward after the cast product 45 is taken out from the die as shown by the arrow (5).

Figure 9:
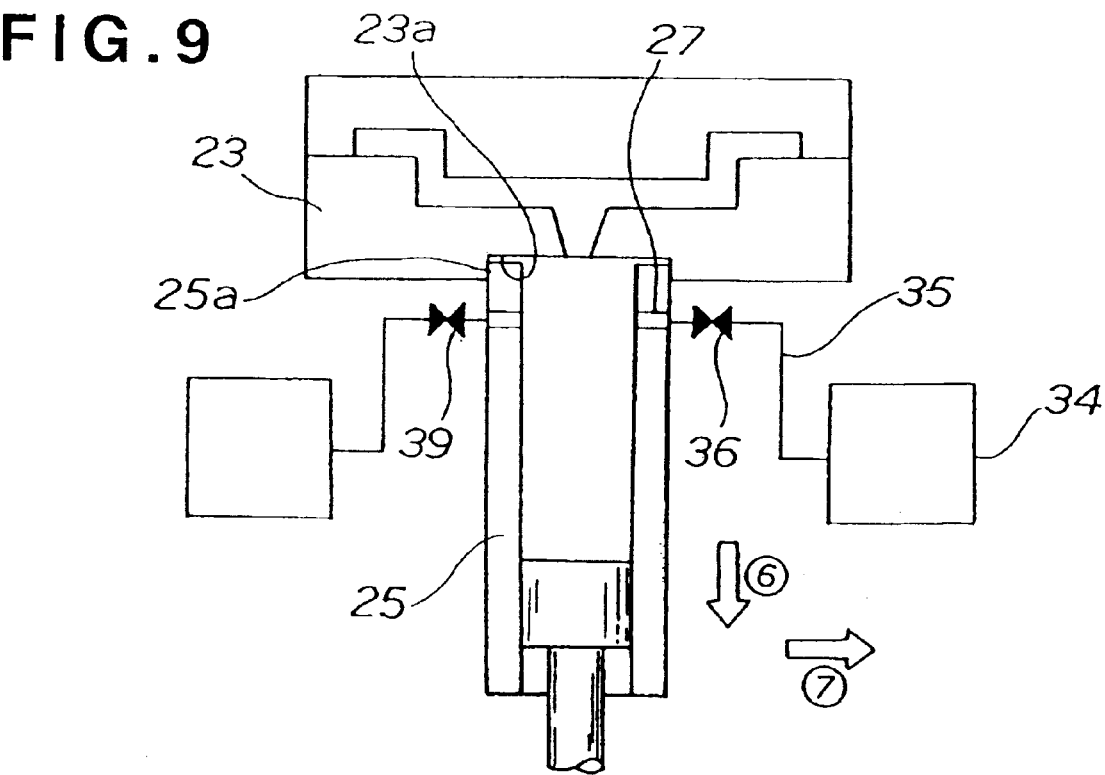

As shown in FIG. 9, the top end 25a of the injection cylinder 25 is pulled out of the recess 23a by moving the injection cylinder 25 downward by the cylinder driving means (not shown) as shown by the arrow (6). Then the injection cylinder 25 is removed from the stationary die 23. Thereafter, the injection cylinder 25 is moved laterally as shown by the arrow (7).

Figure 10:
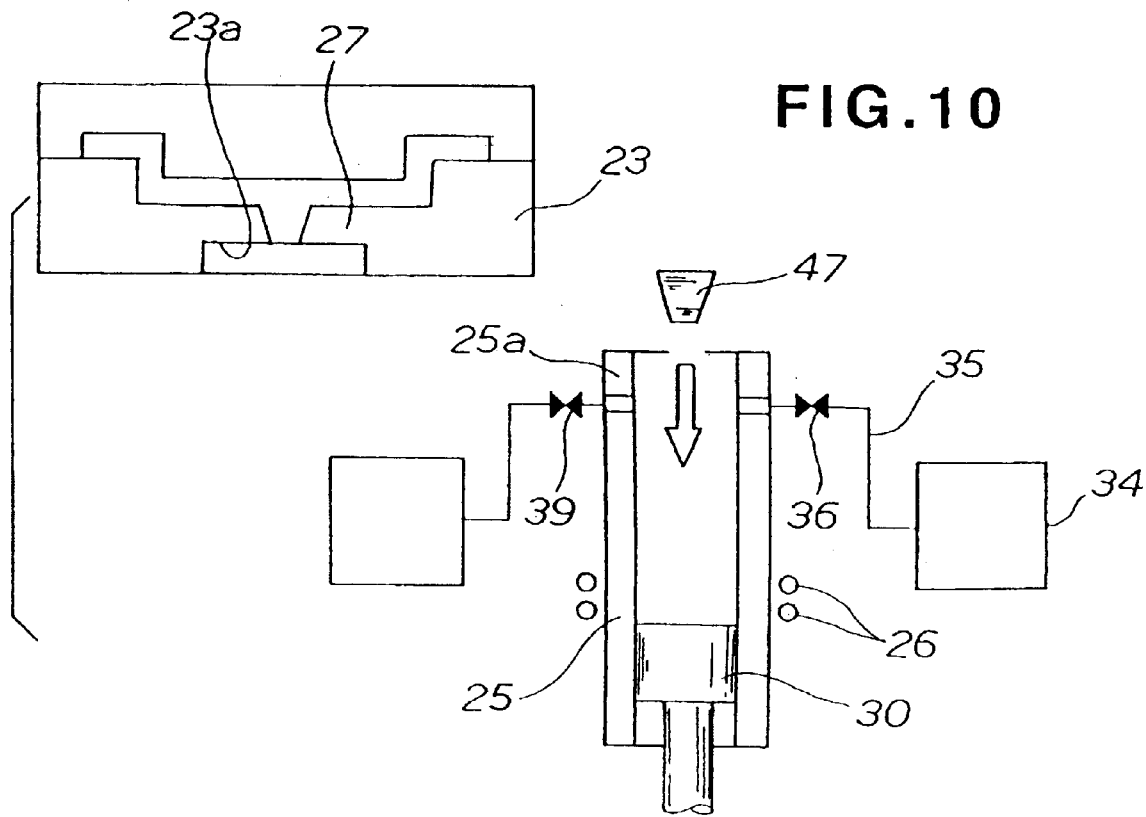
Figure 11:
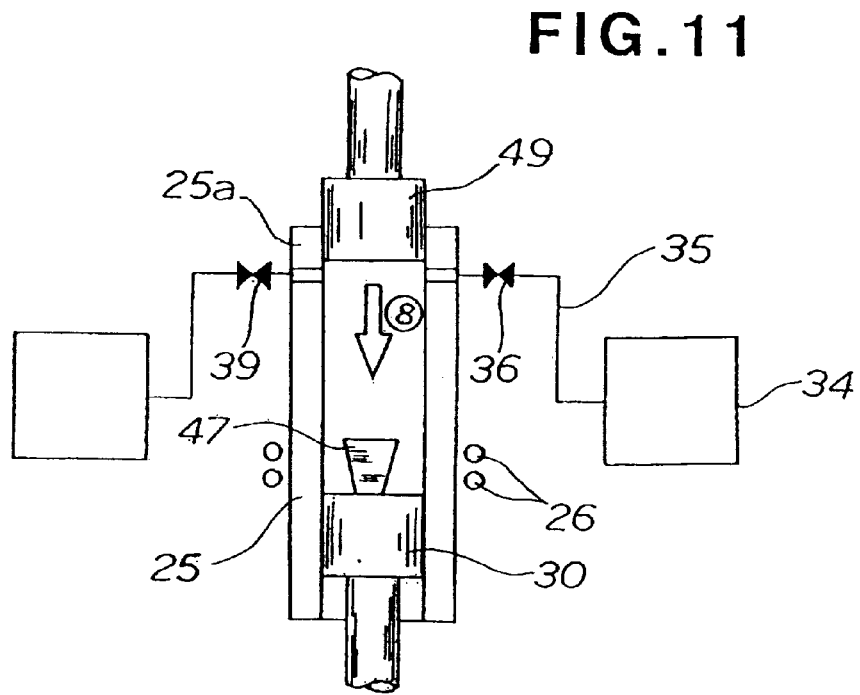

Then, as shown in FIG. 10, the high-temperature non-product portion 47 is put into the injection cylinder 25 from above the injection cylinder 25 as shown by the arrow. At the same time, the non-product portion 47 is heated by the heater 26. Then as shown in FIG. 11, the pressurizing plunger 49 is inserted from the top end 25a side of the injection cylinder 25 as shown by the arrow (8) in a state in which the non-product portion 47 is placed on the upper end surface of the plunger 30 of the injection cylinder 25.

Figure 12:
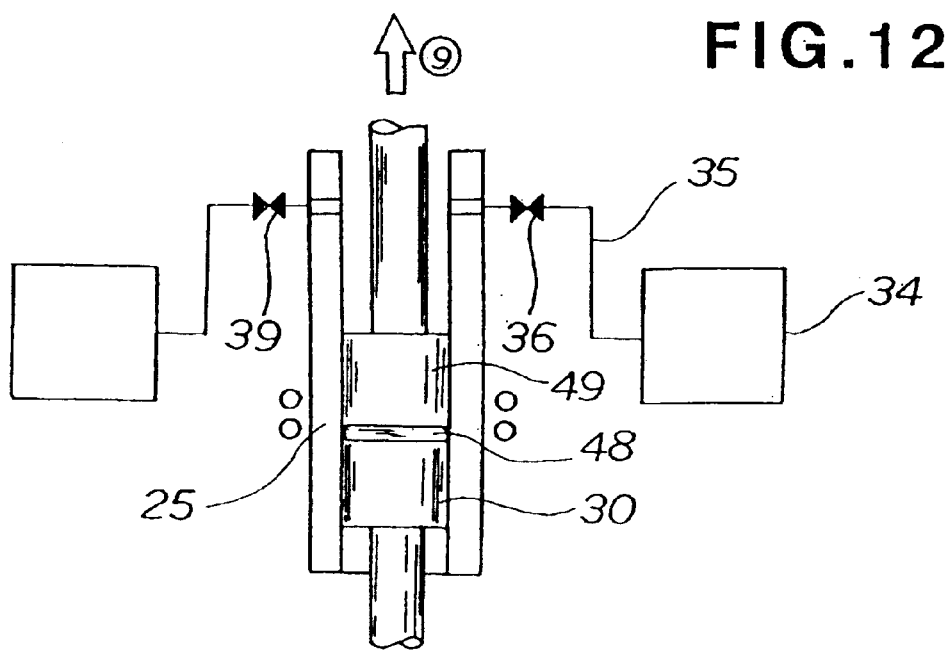

In FIG. 12, the billet 48 is obtained by pressing the non-product portion 47 of high-temperature with the pressurizing plunger 49 and the plunger 30. Then, the pressurizing plunger 49 is moved upward as shown by the arrow (9) and pulled out of the injection cylinder 25.

As a next step, the injection cylinder 25 is mounted to the stationary die 23 by inserting the top end 25a of the injection cylinder 25 into the recess 23a on the stationary die 23 in reverse order from the sequence described in conjunction with FIG. 9.

Figure 13:
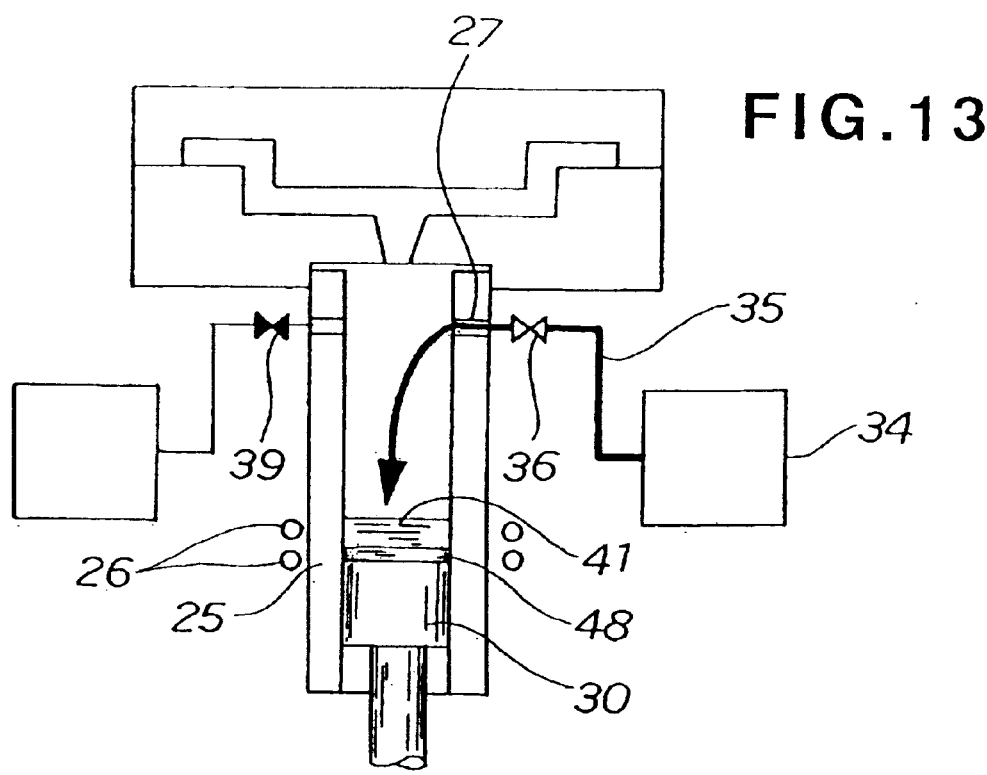

In FIG. 13, Al alloy 41 in the half-solidified state is fed through Al alloy feeding hole 27 into the injection cylinder 25 by the Al alloy feeding means 34 as shown by the arrow with the shut-off valve for MMC 39 closed and the shut-off valve for Al alloy 36 opened, so that Al alloy 41 in the half-solidified state is filled on the billet 48. Therefore, the filling amount of Al alloy 41 can be reduced by the volume of the billet 48 from the filling amount described in conjunction with FIG. 4.

Figure 14:
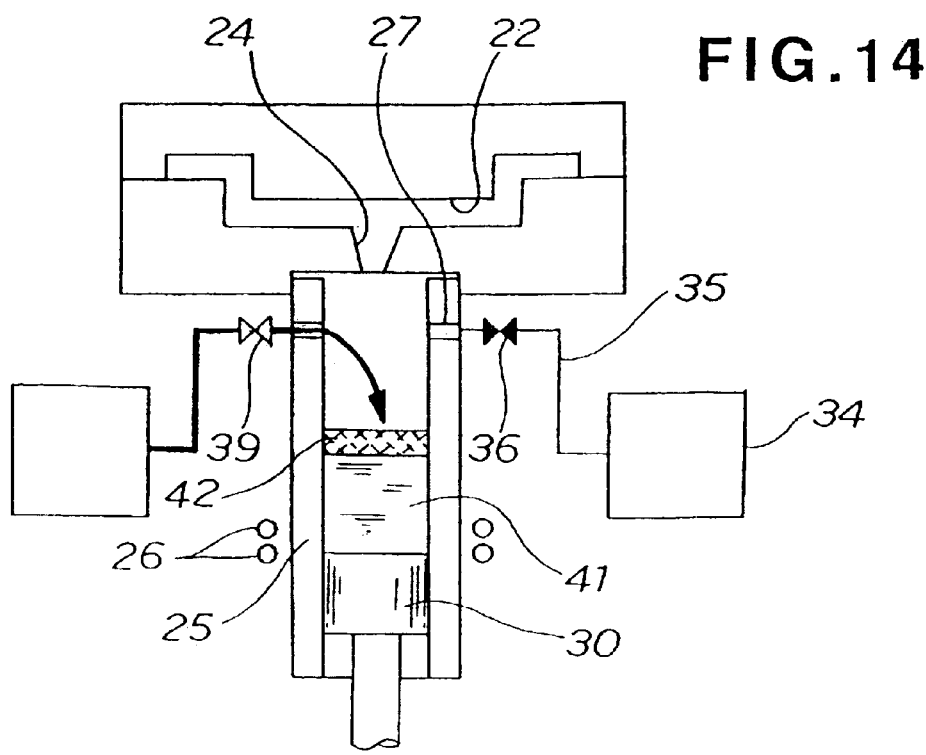

In this way, after filling Al alloy 41 in the half-solidified state into the injection cylinder 25, the billet 48 is melted by heat from Al alloy 41 and from the heater 26, and then is mixed into Al alloy 41 in the half-solidified state as shown in FIG. 14. Subsequently, Al alloy matrix composite material 42 in the molten state is fed by the MMC feeding means 37 through the MMC feeding port 38 into the injection cylinder 25 as shown by the arrow with the shut-off valve for Al alloy 36 closed and the shut-off valve for MMC 39 opened to be ready for the next injection.

According to a method of injection molding metallic material of the first embodiment, injecting materials into the cavity 22 in the sequence of Al alloy matrix composite material 42 and Al alloy 41 enables to fill Al alloy matrix composite material 41 in the cavity 22 and to leave the Al alloy 41 at the gate 24. Therefore, since it is not necessary to separate SiC grains from Al alloy matrix composite material 42 when reusing the non-product portion 47 remained at the gate 24, the expense for separating SiC grains can be eliminated.

The non-product portion 47 is molded and shaped into a billet 48 while it is still hot (as an example, 400 to 100° C., or the temperature slightly lower than the solidifying temperature), and the billet 48 is melted by the use of heat of the half-solidified Al alloy 41 in the injection cylinder 25. By utilizing heat from Al alloy 41 for melting the billet 48, heat energy required for melting the billet 48 may be reduced.

Since the billet 48 is melted while it is still hot in the first embodiment, heat energy can further be saved and thus the nonproduct portion 47 can be reused without putting on the shelf, thereby reducing costs for the product portion 46 (or disc rotor 10).

In addition, the non-product portion 47 of high-temperature is put into the injection cylinder 25 and the non-product portion 47 is pressed into a billet 48 with the plunger 30 in the injection cylinder 25. Therefore, the injection cylinder 25 and the plunger 30 can be utilized effectively, thereby reducing equipment expenses for pressing operation. Accordingly, the cost of the product portion 46 can further be reduced.

When the non-product portion 47 is pressed into a billet 48 outside of the injection cylinder 25, it is necessary to transport the non-product portion 47 to the pressing equipment (not shown), and then after pressing, it is necessary to transport to the injection cylinder 25. Since it takes a lot of trouble in transportation, which resists improvement of productivity. However, according to the first embodiment of the present invention, by pressing into the billet 48 in the injection cylinder 25, it can save labor for transportation and thus productivity can be improved.

In addition, the billet 48 obtained by pressing the non-product portion 47 is placed on the upper surface of the plunger 30 in a first place, and Al alloy 41 is filled and heated thereon, and then Al alloy matrix composite material 42 is filled in the injection cylinder 25. Therefore, Al alloy 41 in the half-solidified state including molten billet 48 is not forced into the cavity 22 but remains at the gate 24 when performing injection molding. As a consequent, even if the billet 48 contains impurities, they cannot be mixed in the product portion 46.

Figure 15:
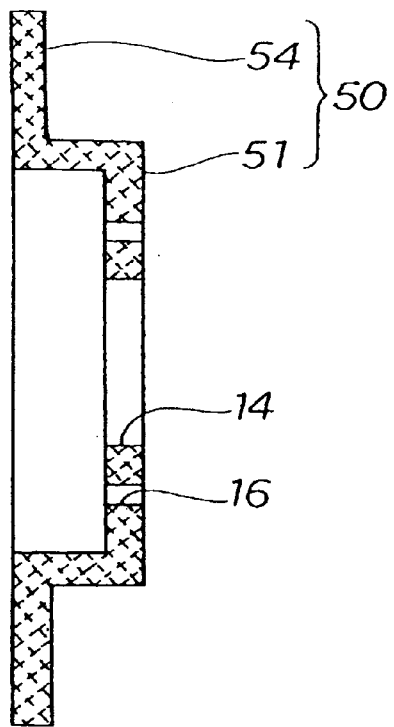
FIG. 15 is a cross sectional view of a disk rotor molded by a method of injection-molding metallic material, according to a second embodiment of the present invention.

Now, a method of injection molding according to the second embodiment will be described. FIG. 15 is a disk rotor formed by a method of injection-molding metallic material according to the second embodiment.

The disk rotor 50 comprises, as in the case of the first embodiment, a cylindrical hub portion 51, and a disk-shaped disk portion 54 integrally formed with the hub portion 51. The hub portion 51 and the disk portion 54 are formed only of Al alloy matrix composite material.

Figure 16:
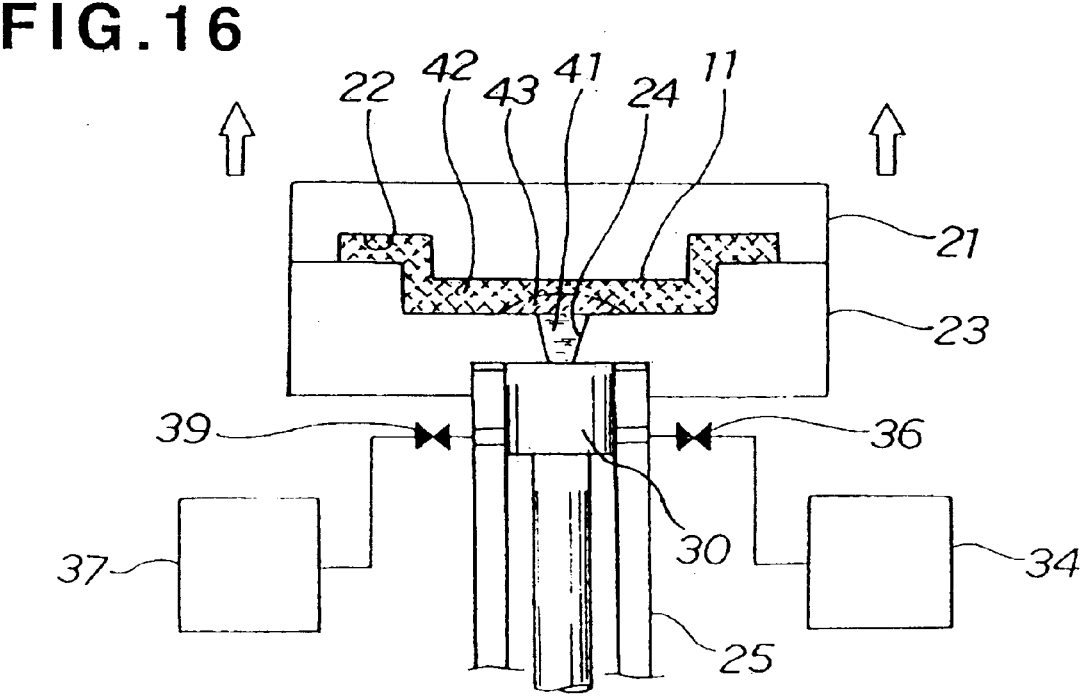
FIG. 16 and FIG. 17 are explanatory views showing a method of injection-molding metallic material, according to the second embodiment of the present invention.
Figure 17:
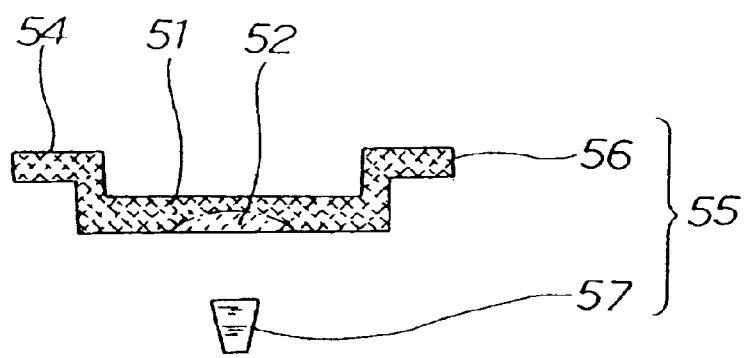

Referring now to FIG. 16 and FIG. 17, a method of injection-molding metal matrix composite material according to the second embodiment will be described.

In FIG. 16, as in the first embodiment, Al alloy 41 in the half-solidified state and Al alloy matrix composite material 42 in the molten state are fed into the injection cylinder 25 by the Al alloy feeding means 34 and the MMC feeding means 37, and then the shut-off valve for Al alloy 36 and the shut-off valve for MMC 39 are closed as shown in the figure. In this case, the filling amount of Al alloy 41 is smaller than that described in the first embodiment, and the filling amount of metal matrix composite material 42 is larger than that described in the first embodiment.

Then, the plunger 30 is moved upward until it reaches to the lower surface of the stationary die 23. By filling Al alloy 41 in the half solidified state into the gate 24, Al alloy matrix composite material 42 in the molten state is filled into the cavity 22. The area filled with Al alloy matrix composite material 42 is reticulated.

On the other hand, a part of Al alloy 41 is forced from the gate 24 into the cavity 22 and thus Al alloy matrix composite material 42 is impregnated with Al alloy 41. The portion with diagonal lines represents the area 43 of Al alloy matrix composite material 42 impregnated with Al alloy 41.

Subsequently, the movable die 21 is moved upward to open the die as shown by the arrow.

The cast product 55 is taken out of the opened die as shown in FIG. 17, and the non-product portion 57 of the cast product 55 is cut off the product portion 56. The disk rotor 50 is obtained by processing the product portion 56. Since the portion 52 of Al alloy contained in the product portion 56 is small, it is removed when the product portion 56 is processed.

On the other hand, since the non-product portion 57 is formed only of Al alloy, it can be reused. Therefore, as in the first embodiment, the cost of the disk rotor 50 can be reduced.

In the first and second embodiment described above, metal matrix composite material 42 employed is Al alloy matrix composite material obtained by adding SiC grains to Al alloy matrix. However, it is also applicable to employ metal matrix composite material comprising a matrix formed of other metal materials and a reinforcing material (such as SiC or alumina) in the state of fibers, grains or a plate contained therein.

In addition, in the first and the second embodiment, a method of molding a high strength disk rotor 10 by filling Al alloy matrix composite material 42 in the molten state in the cavity 22 and leaving Al alloy 41 in the half-solidified state at the gate 24 is described as an example. However, the method of injection molding a metallic material according to the present invention may be applied to the case where the product is formed only of Al alloy 41 or other metal material by injection molding.

Figure 18:
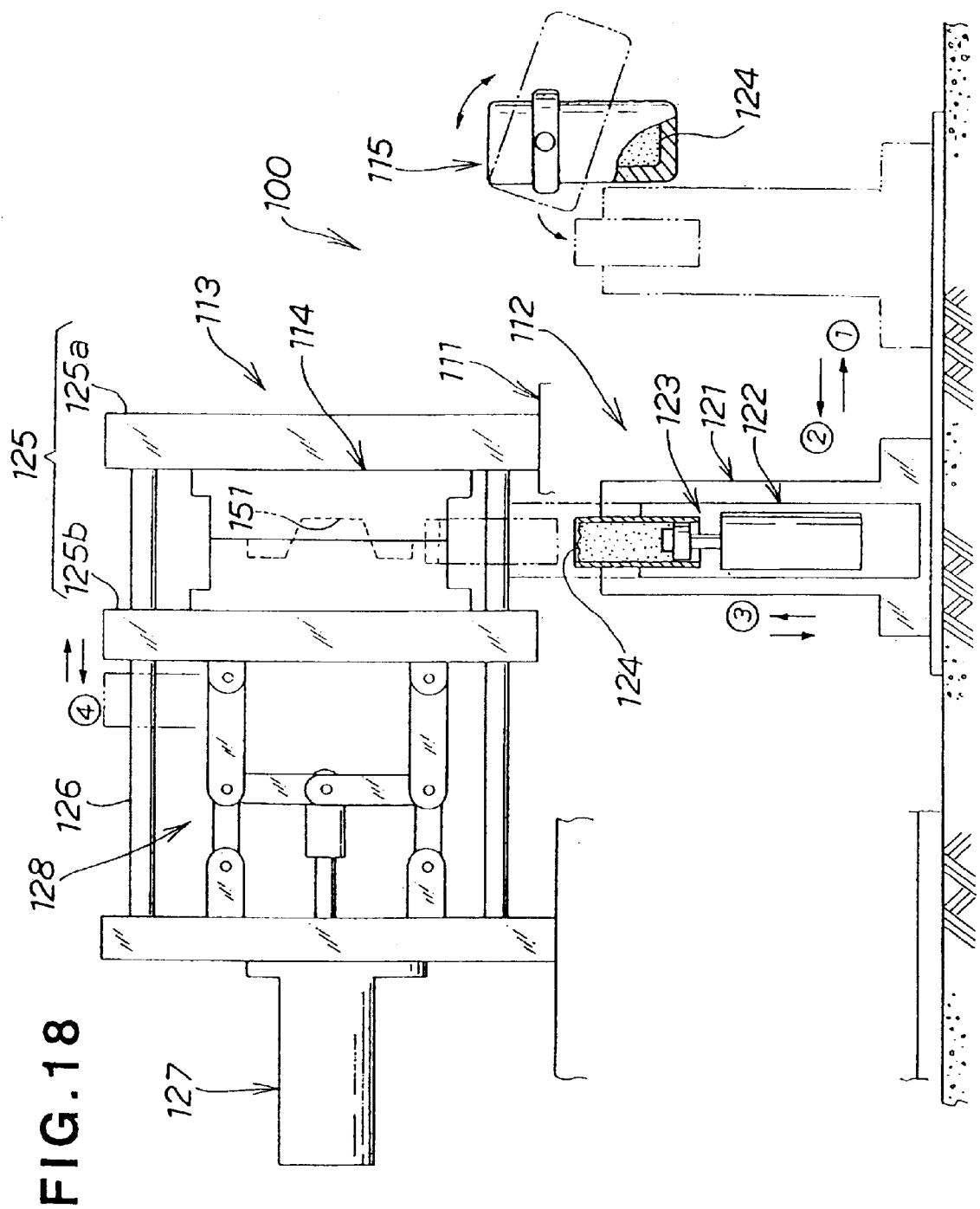
FIG. 18 is a view showing an overall arrangement of a molding apparatus for disk rotors, according to the present invention.

FIG. 18 shows an injection molding apparatus for disk rotors shown in the schematic diagram.

The injection molding apparatus 100 for disk rotors comprises a molten material filling apparatus 112 placed on the stand 111, and a molding apparatus 113. The molding apparatus 113 comprises a die 114. The reference numeral 115 designates a molten material feeding apparatus for feeding the molten material 124 such as metal matrix composite material into the molten material filling apparatus 112.

The molten material filling apparatus 112 comprises a transporting apparatus 121, a hoisting apparatus provided on the transporting apparatus 121, and a injection apparatus 123 mounted on the hoisting apparatus. The molten metal matrix composite material 124 is injected in the cavity 151 of the die 114 from the injection apparatus 123.

The transporting apparatus 121 moves the hoisting apparatus 122 and the injection apparatus 123 toward the side of the molten material feeding apparatus 115 (in the direction shown by the arrow (1)) as shown by a phantom line, and the molten material 124 fed from the molten material feeding apparatus 115 is transported (in the direction shown by the arrow (2)). The hoisting apparatus 122 moves upward as shown by a phantom line (in the direction shown by the arrow (3)) to connect the injection apparatus 123 with the die 114, and moves downward after the injection apparatus 123 injected the molten material 124.

The molding apparatus 113 comprises a die mounting board 125 (stationary board 125a, movable board 125b) for mounting the die 114, a tie bar 126 for supporting the die mounting board 125, a cylinder 127 for opening and closing the die 114, and a toggle link mechanism 128. In this example, opening and closing of the die 114 is made in the lateral (horizontal) direction. The movable board 125b moves in the die opening direction (in the direction shown by the arrow (4)) as shown in a phantom line to open the die 114, and the cast disk rotor is taken out by the takeoff apparatus (not shown).

Figure 19:
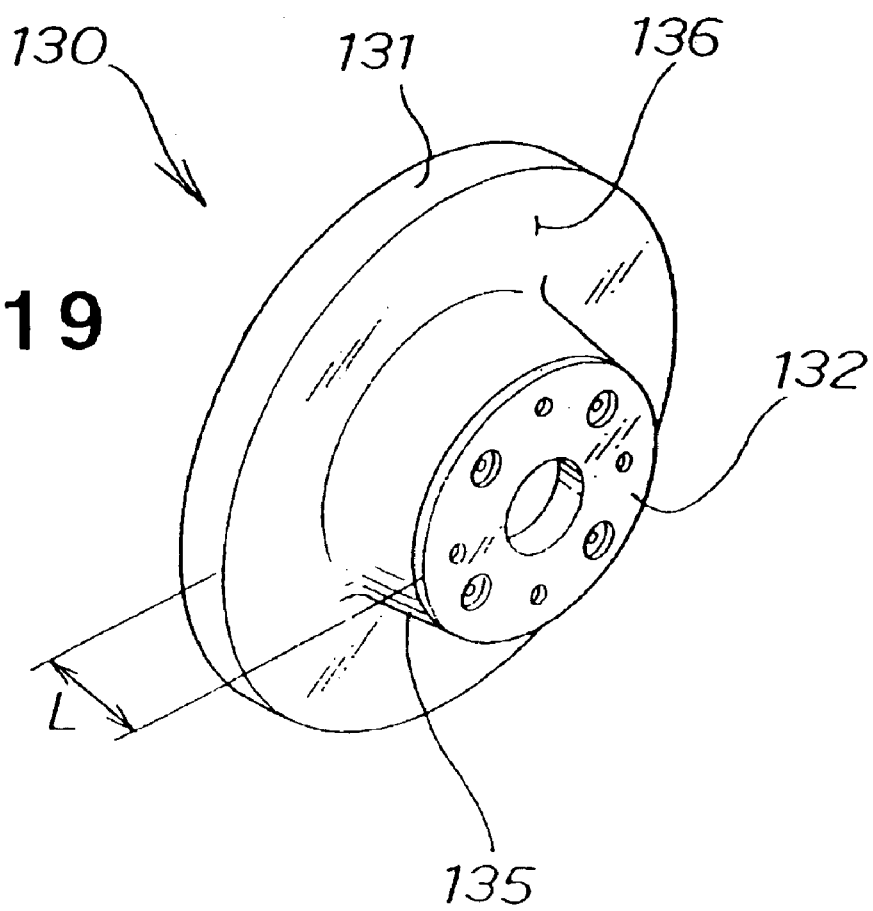
FIG. 19 is a perspective view of a disk rotor.

FIG. 19 is a perspective view of the disk rotor manufactured by the molding apparatus according to the present invention. The disk roller 130 comprises a brake ring portion 131 as a disk-shaped disk portion, and a cylindrical hub portion 135 formed integrally with the brake ring portion 131 and extending outwardly. The hub portion 135 comprises a lid portion 132 on the projected outer end thereof. The lid portion 132 is formed with an opening at the center thereof. The hub portion 135 projects by a constant distance L from the outer surface 136 of the brake ring portion 131 to the outer surface of the lid portion 132.

Figure 20:
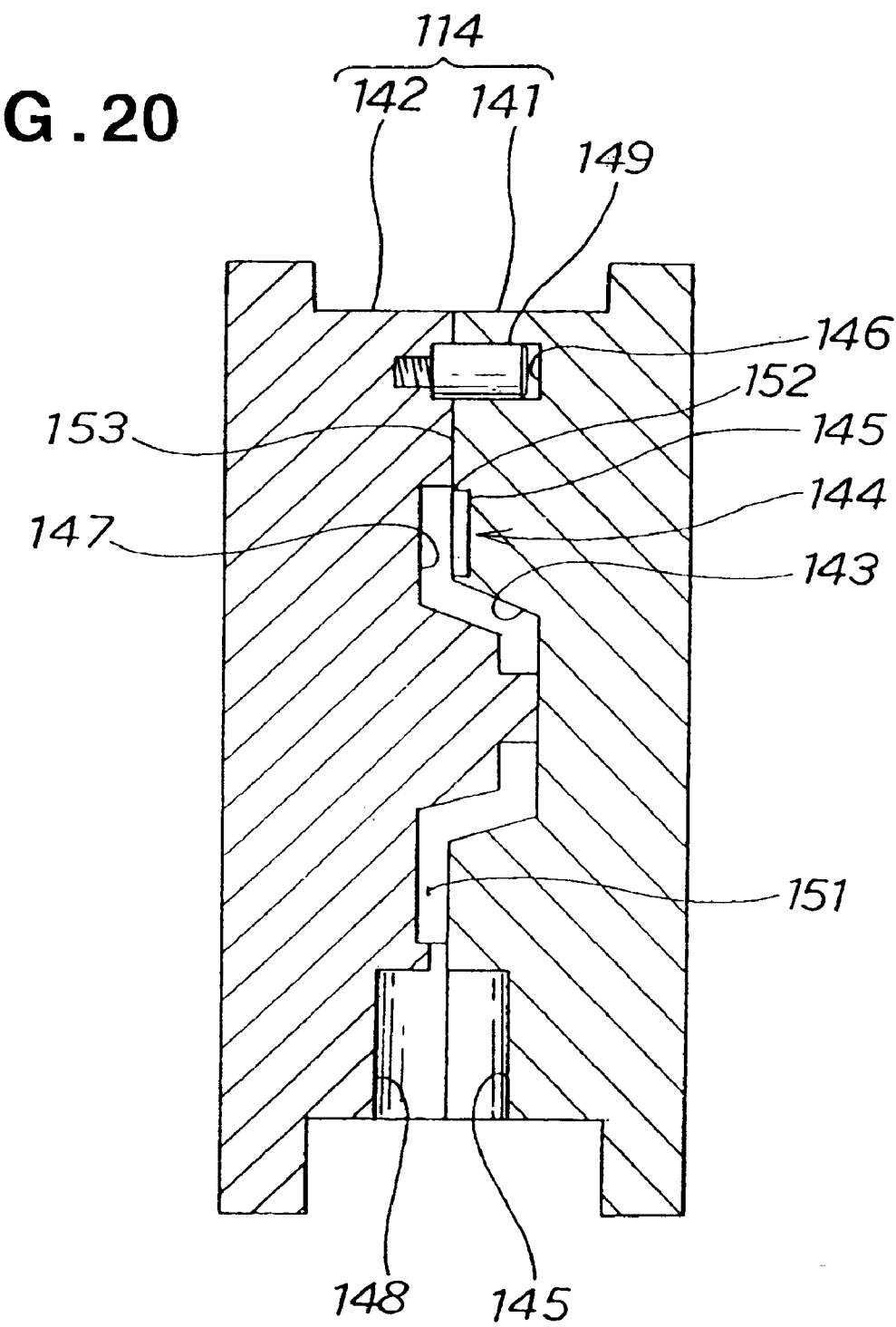
FIG. 20 is a cross sectional view showing a forming die according to the present invention.
Figure 21:
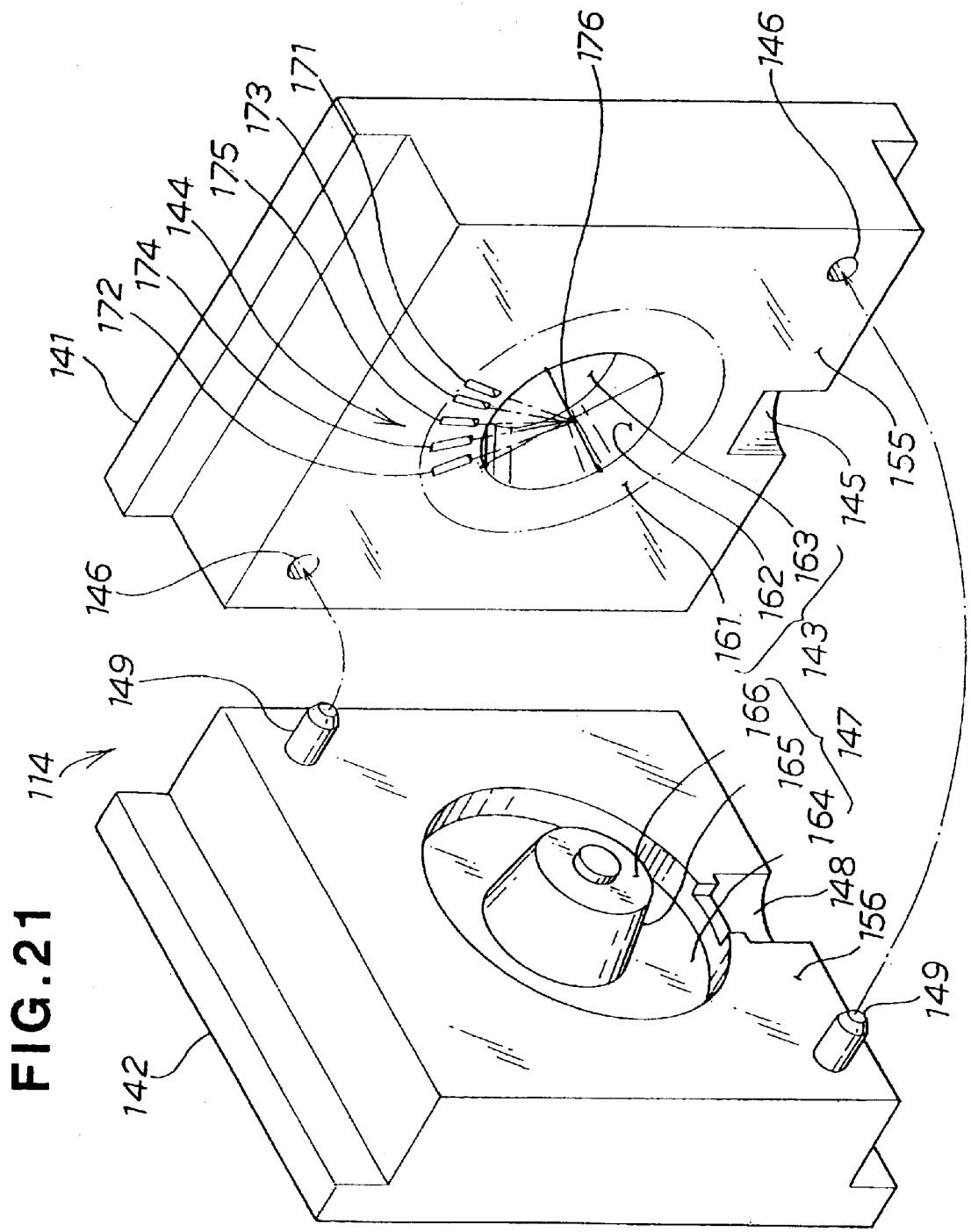
FIG. 21 is a perspective view of the forming die shown in FIG. 20.

FIG. 20 and FIG. 21 show a die. The die 114 comprises a stationary die 141 and the movable die 142. The stationary die 141 is formed with a stationary side die surface 143. The stationary side die surface 143 is formed with an overflow portion 144 on the upper side thereof. The stationary side die surface 143 is formed with a gate 145 connecting to the die surface 43 at the lower portion thereof. Two pin holes 146, 146 (See FIG. 21) for positioning are formed on the stationary die 141. The movable die 142 is formed with a movable side die surface 147. The movable die 142 is formed with a gate 148 connecting to the movable side die surface 147 at the lower portion thereof. The positioning pins 149, 149 for fitting into the pin holes 146, 146 are provided on the movable die 142. The stationary side die surface 143 and the movable side die surface 147 define a cavity 151 of the die 114. The die 114 is a cast die with an overflow portion 144 evaginated on the upper portion 152 of the cavity 151 so that the cavity 151 is oriented in the vertical direction. The reference numeral 153 designates a parting line.

In FIG. 21, the reference numeral 155 designates a parting surface of the stationary die 141, and the reference numeral 156 designates the parting surface of the movable die 142.

The stationary side die surface 143 comprises a stationary side die surface for rings 161 for forming brake ring portions 131 (See FIG. 19), a stationary side die surface for hubs 162 for forming the hub portions 135, and a stationary side die surface for lids 163 for forming the lid portions 132 (See FIG. 19). The movable side die surface 147 comprises a movable side die surface for rings 164 for forming the brake ring portions 131, a movable side die surface for the hubs 165 for forming hubs 135, and a movable side die surface for the lids 166 for forming the lid portions 132. In other words, the cavity 151 for forming the brake ring portions 131 (See FIG. 20) is defined by the stationary side die surface for rings 161 and a movable side die surface for rings 164, and the cavity 151 for forming lid portions 132 (See FIG. 19) is defined by the stationary side die surface for lids 163 and the movable side die surface for lids 166.

The overflow portion 144 comprises a plurality of recesses 171, 172, 173, 174, 175 extending radially from the center 176 of the die in the shape of grooves on the upper portion of the stationary side die surface for rings 161.

Figure 22:
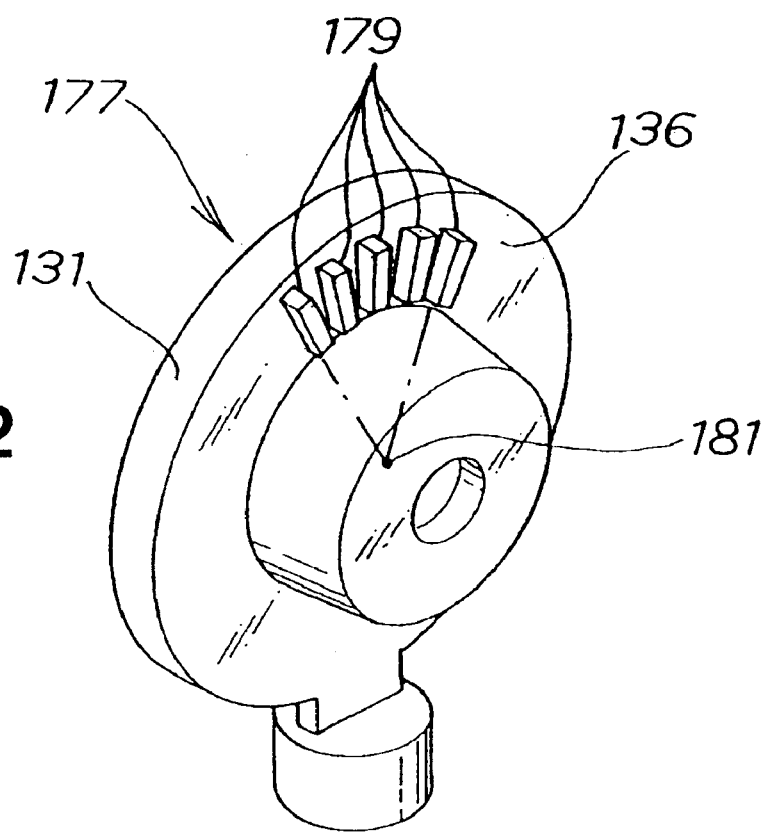
FIG. 22 is a perspective view of the disk rotor manufactured by the forming die according to the present invention.

FIG. 22 is a perspective view of the disk rotor formed of a cast product manufactured by the use of the molding apparatus of the present invention. The cast product 177 of the disk rotor is formed with a plurality of rib-shaped projections 179 radially extending from the center 181 of the brake ring portion 131 on the outer surface 136 thereof by the overflow portion.

The operation of the disk rotor molding apparatus described above will now be described.

Figure 23A:
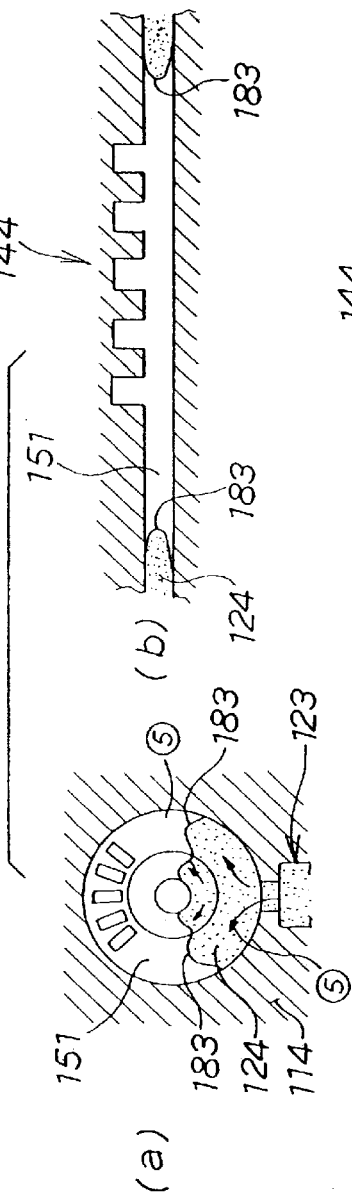
FIG. 23A to FIG. 23C are explanatory views showing how a molten material flows as it is injected into the die.
Figure 23B:
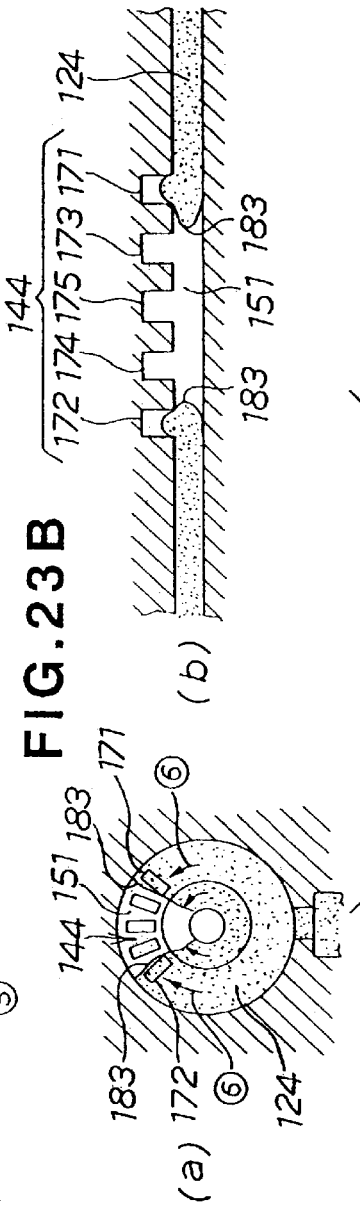
Figure 23C:
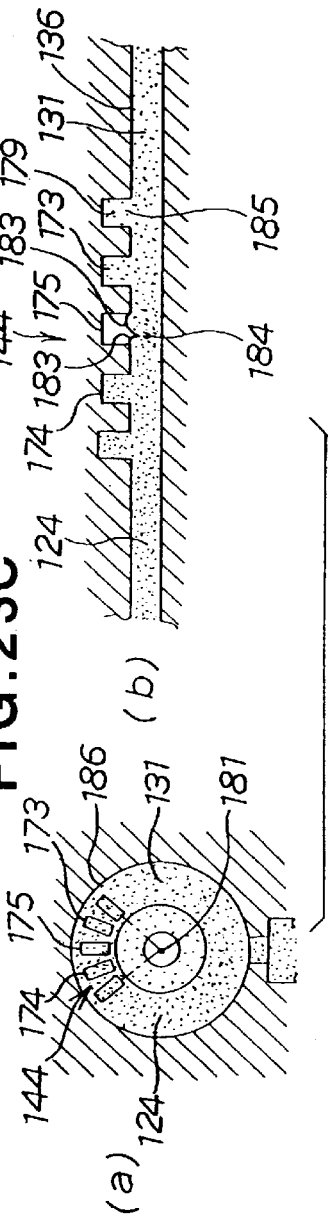

FIG. 23A to FIG. 23C are views showing the operation of the disk rotor molding apparatus according to the present invention, in which the flow of the molten material 124 in the cavity 151 is shown in a schematic form. (a) shows side views of the stationary die 114, and (b) shows interior elevations thereof.

In FIG. 23A (a), the molten metal matrix composite material 124 is injected into the die 114 upwardly from below by means of the injection apparatus 123. The molten material 124 branches off to the left and the right and flows in the cavity 151 as shown by the arrows (5), (5). At the same time, when it flows in the cavity 151 shown in (b), the cooling action works on the top ends 183, 183 of the molten material 124.

In FIG. 23B(a) and (b), the molten material 124 flows in the cavity 151 as shown by the arrows (6),(6), and goes into the overflow portion 144. Since the volume of the flow path (cavity 151) is increased by the recesses 171, 172 of the overflow portion 144 to increase the amount of the molten material 124, the top ends 183, 183 resists lowering in temperature. In addition, increase in the volume of the flow path (cavity 151) alleviates resistance acting on the molten material 124 and prevents retention of the molten material 124.

As shown in FIG. 23C(a) and (b), the top ends 183, 183 of the molten material 124 are further forced into the overflow portion 144. In other words, the recesses 173, 174 of the overflow portion 44 contributes to increase in the volume of contained molten material, thereby contributing to heat-retention and to prevention of retention.

When the molten material 124 goes into the recess 175 at the center of the overflow portion 144, and then the top ends 183, 183 of the molten material 124 are joined with each other, the top ends 183, 183 are pressed against each other to melt the joint 184 completely. Therefore, occurrence of cold shuts and scabs can be prevented.

Providing the overflow portion 144 so as to face toward the outer surface 136 of the brake ring portion 131 can increase the cross sectional area of the inlet port 185 of the overflow portion 144. As a consequent, resistance of inflow of the molten material into the overflow portion 144 is reduced, and simultaneously, the volume of contained molten material is increased, thereby resisting lowering in temperature of the molten material 124.

In addition, since the overflow portion 144 extends radially from the center 181 of the brake ring portion 131 in the state of grooves, the inlet port 185 of the overflow portion 144 opens from the center 181 side toward the edge 186 side. As a consequent, the volume of the contained molten material between the center 181 side and the edge 186 side increases, whereby the temperature of the molten material from the center 181 side to the edge 186 side resists lowering, and thus the top ends 183, 183 of the molten material 124 can be molten completely. Therefore, cold shuts and scabs can completely be prevented.

Since the overflow portion 144 extends radially from the center 181 of the brake ring portion 131 in the state of grooves, the projections 179 (See also FIG. 2) formed by the overflow portion 144 can be cut off simultaneously with the cutting operation of the brake ring portion 131 (See also FIG. 19), so that the projection 179 can easily be removed.

Since the overflow portion 144 extends radially from the center 181 of the brake ring portion 131 in the state of grooves, the same effect can be expected even when the position of the joint between the top ends 183, 183 of the molten material 124 changes. In other words, the joint 184 of the molten material 124 is not necessarily formed in the recess 175, but the same effect can be achieved between the recess 171 and the recess 175 even when the position of the joint 184 varies.

Figure 24A:
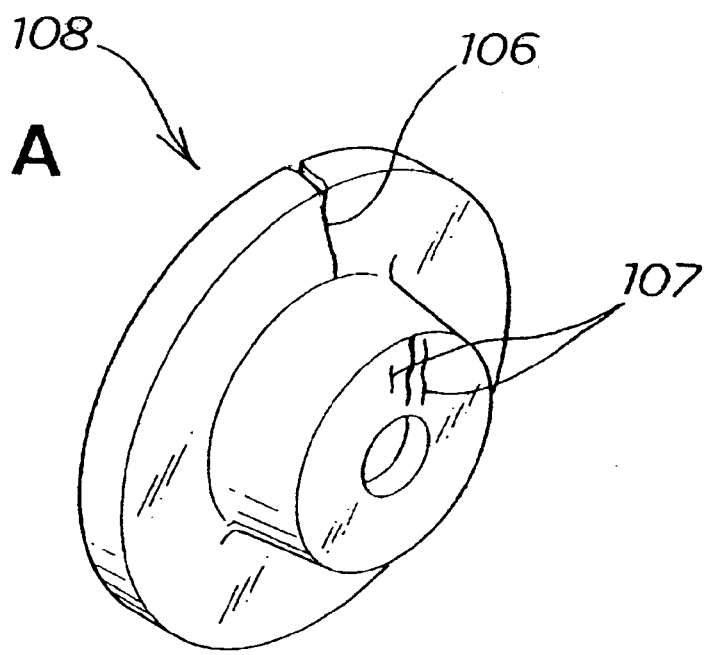
FIG. 24A and FIG. 24B are views showing a comparative example and an embodiment of the cast disk rotor, respectively.
Figure 24B:
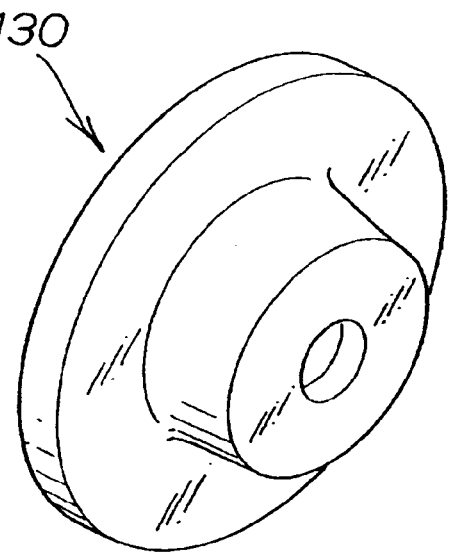

FIG. 24A and FIG. 24B are comparative views of cast disk rotors.

FIG. 24A shows a disk rotor 108 formed by the disk rotor molding apparatus in the related art with cold shuts 106 and scabs 107 generated thereon.

FIG. 24B shows a disk rotor 130 formed by the disk rotor molding apparatus according to the present invention. As shown in the figure, cold shuts 106 and scabs 107 are not generated by the molding apparatus according to the present invention.

Another embodiment of the disk rotor molding material according to the present invention will be described referring to FIG. 25 and FIG. 26.

Figure 25:
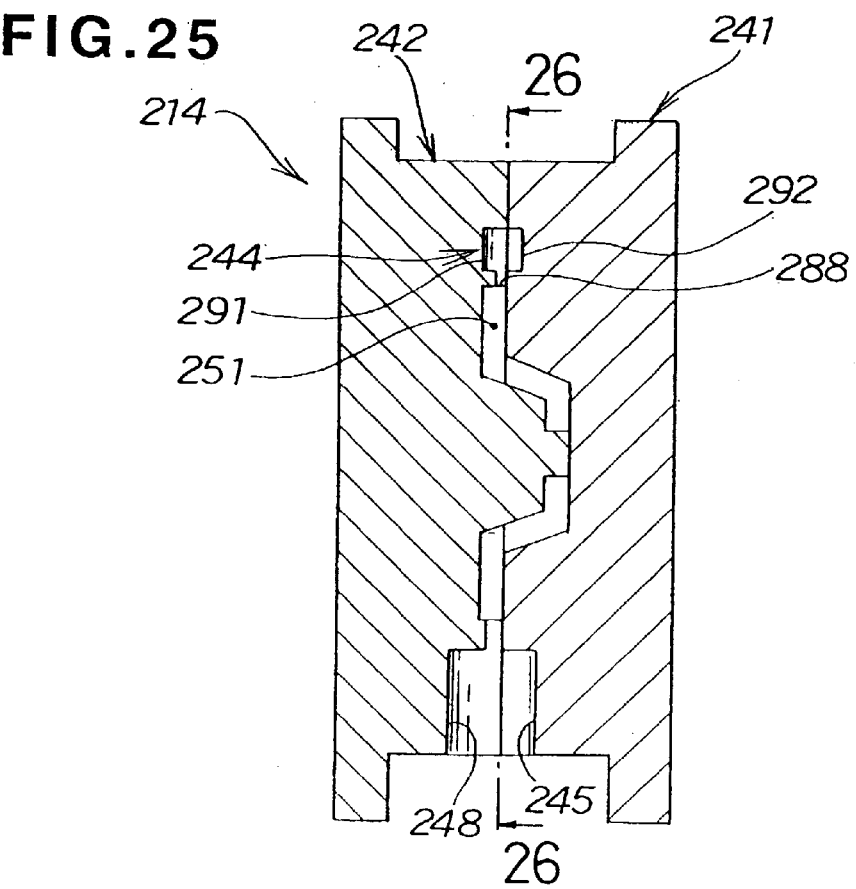
FIG. 25 and FIG. 26 are views showing another embodiment of the forming die.

FIG. 25 is a cross sectional view of the principal portion of the die 214. The die 214 (stationary die 241, movable die 242) has an overflow portion 244 above the cavity 251 in communication with the outer edge 288 of the cavity 251. The reference numerals 245 and 248 designate a gate.

Figure 26:
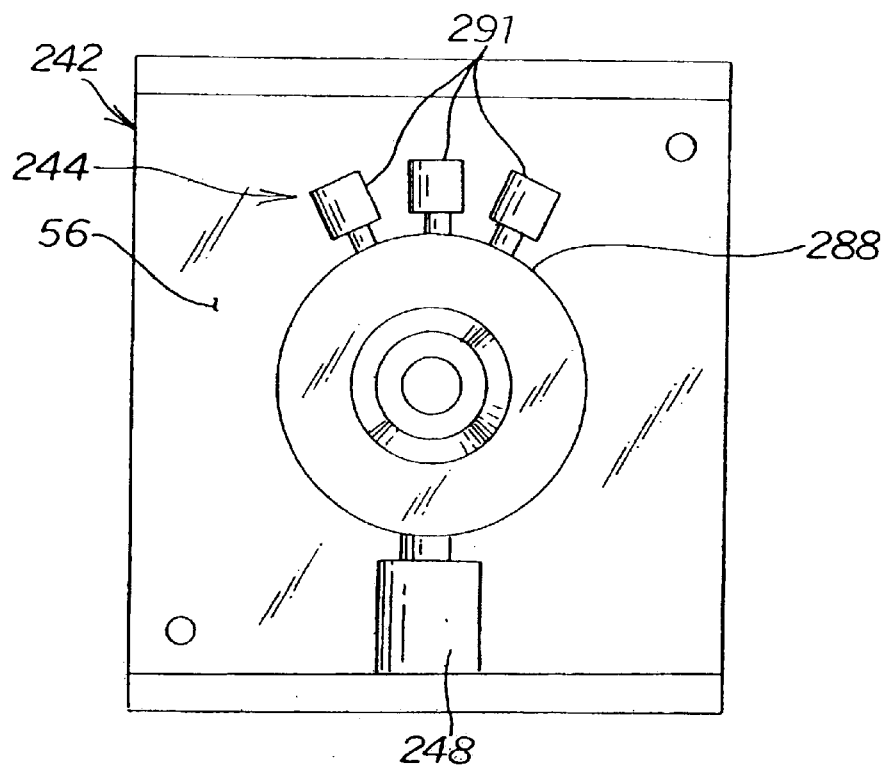

FIG. 26 is a view of the movable die 242 shown in FIG. 25, taken along the line 26—26. The overflow portion 244 is constructed of a plurality of trough-shaped recesses 291 formed on the parting surface 256 of the movable die 242, and likewise, trough-shaped recesses 292 formed on the stationary die 241 (See FIG. 25).

As shown in the figure, since the overflow portion 244 is provided above the cavity 251 in communication with the outer edge 288 of the cavity 251, air pressed by the molten material is flown into the overflow portion 244, and thus the molten material pressurizes air in the overflow portion 244. As a consequent, the volume of the contained molten material increases, and thus the lowering of the temperature is prevented. In addition, since air does not stay in the cavity 251, top ends of the molten materials are positively brought into contact with each other, so that the top ends of the molten materials are melted together. Therefore, occurrence of cold shuts and scabs can be prevented.

Figure 27:
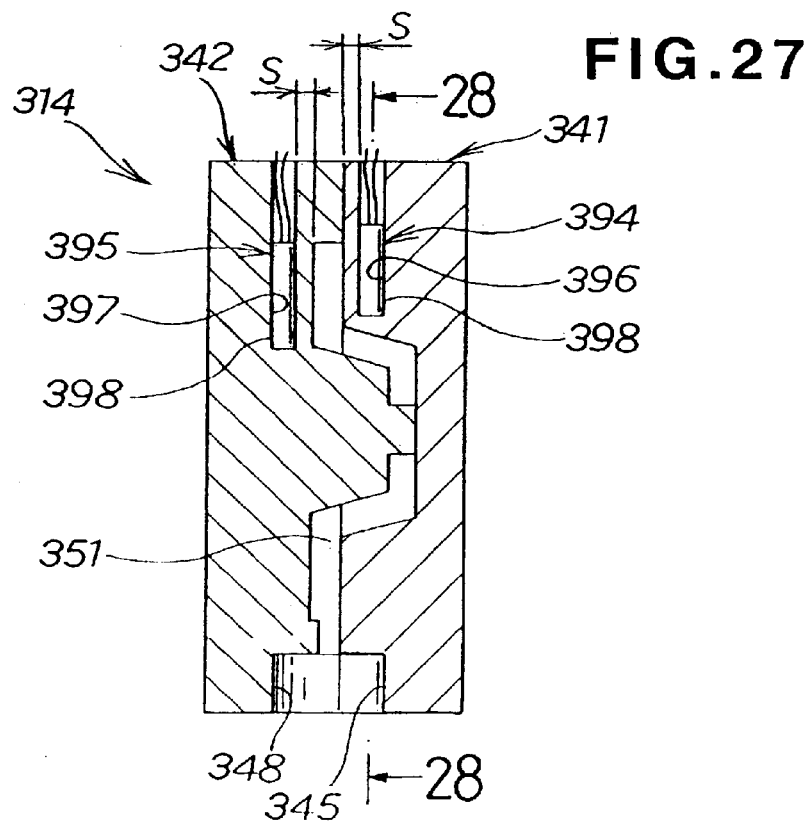
FIG. 27 and FIG. 28 are views showing a still another embodiment of the forming die.
Figure 28:
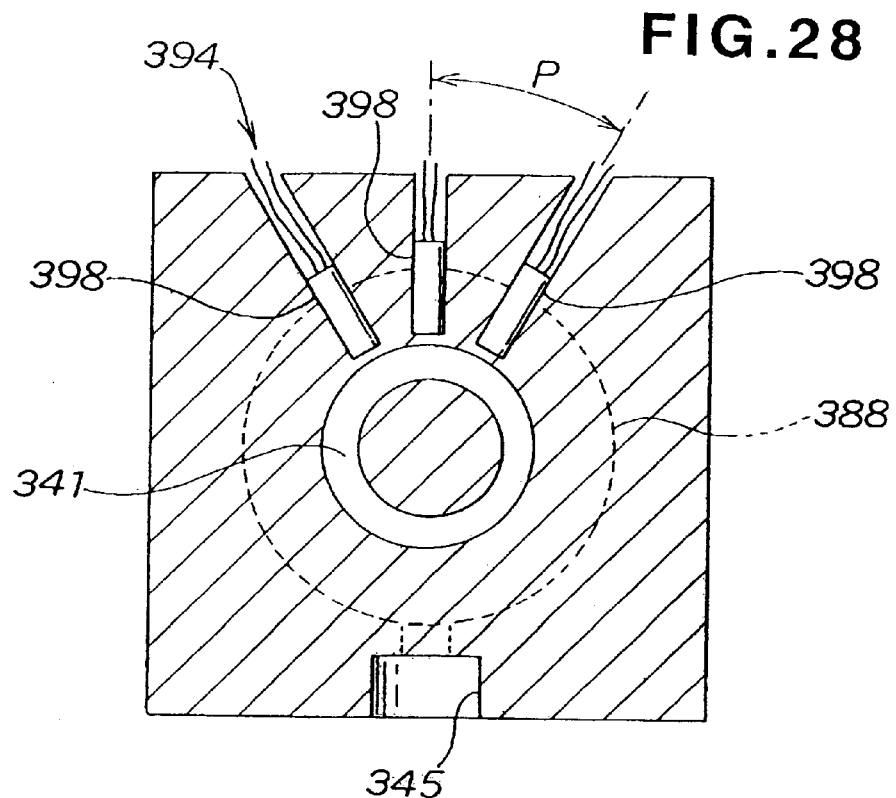

Referring now to FIG. 27 and FIG. 28, still another embodiment of the present invention will be described.

FIG. 27 is a cross sectional view of the principal portion of the die 314. The die 314 (stationary die 341, movable die 342) comprises heating means, such as heaters 394, 395 at the positions near the upper portion of the cavity 351. Heater holes 396, 397 are formed at prescribed distances S, S away from the cavity 351, and cartridge heaters 398, 398 are fitted in the heater holes 396, 397. The reference numerals 345 and 348 designate a gate.

FIG. 28 is a cross sectional view taken along the line 28—28 in FIG. 27. The heater 394 comprises three cartridge heaters 398, 398, 398 provided at prescribed pitches P. The heater 395 has the same structure as the heater 394, and thus the description is omitted.

As shown in the figure, since three cartridge heaters 398 are provided at the positions near the upper positions of the cavity 351, lowering of the temperature at the top end of the molten material can be prevented. Therefore, occurrence of cold shuts and scabs can be prevented. In addition, since the space to be filled with the molten material is only the gate 345, 348 except for the cavity 351, the volume is small, and thus the material can be saved and efficiency of cutting operation is increased.

There may further be provided an overflow portion 144 shown in FIG. 21 according to the embodiment of the present invention on the die surface for forming the lid portion 132.

In addition, the recesses 171 to 175 on the overflow portion 144 may be continued to form a large recess. The overflow portion 144 shown in FIG. 21 and the overflow portion 244 shown in FIG. 25 and FIG. 26 may be combined.

The disk rotor molding apparatus is not limited to the disk rotor molding apparatus 100 shown in FIG. 18. For example, the mechanism other than the toggle link mechanism 128 may be employed, and the piping system may be employed in the molten material supplying apparatus 115. In addition, a electric motor may be employed in addition to the clamping cylinder 127.

An embodiment of the injection apparatus according to the present invention will be described now.

Figure 29:
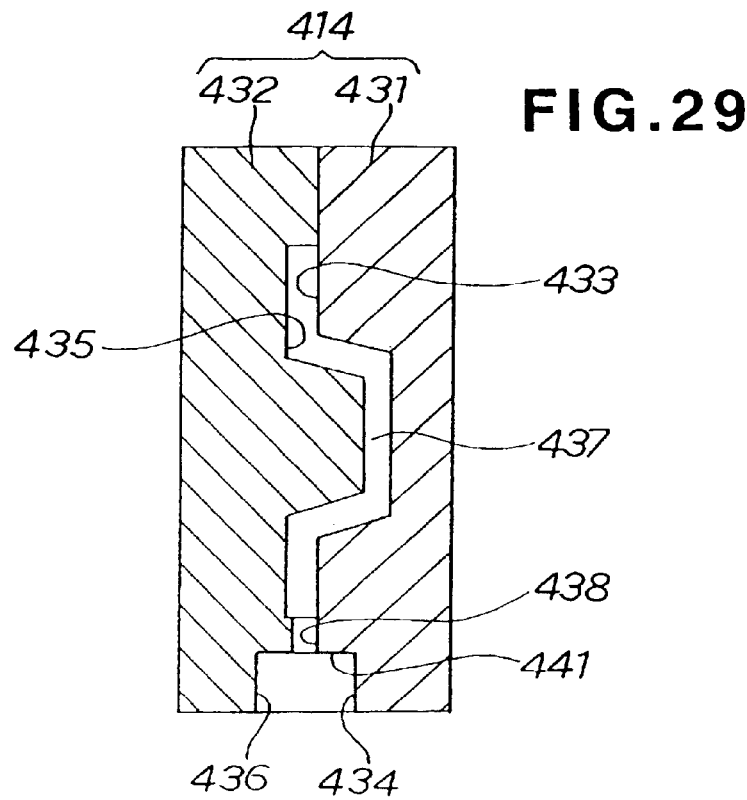
FIG. 29 is a cross sectional view of the die connected to the injection apparatus of the present invention.

FIG. 29 shows a die to be connected with the injection apparatus of the present invention. The die 414 comprises a stationary die 431 and a movable die 432. The stationary die 31 comprises a stationary side die surface 433 and a gate 434 formed in communication with the die surface 433. The movable die 32 comprises a movable side die surface 435 and a gate 436 formed in communication with the die surface 435. The cavity 437 of the die 414 is defined by the stationary side die surface 433 and the movable side die surface 435. The reference numeral 438 designates a cross gate, which is a passage for the molten material connecting between the cavity 437 and the gate 434, 436. The injection apparatus 123 shown in FIG. 18 is connected to the die 414 by being fitted in the gate 434, 436. The reference numeral 441 designates an injection interface.

Figure 30:
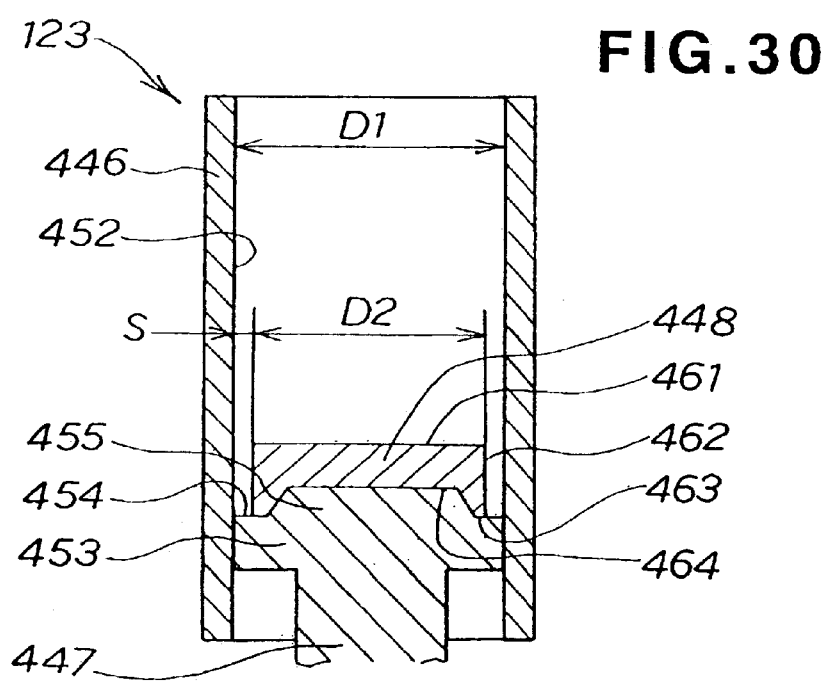
FIG. 30 is an enlarged cross sectional view of the injection apparatus shown in FIG. 18.
Figure 32:
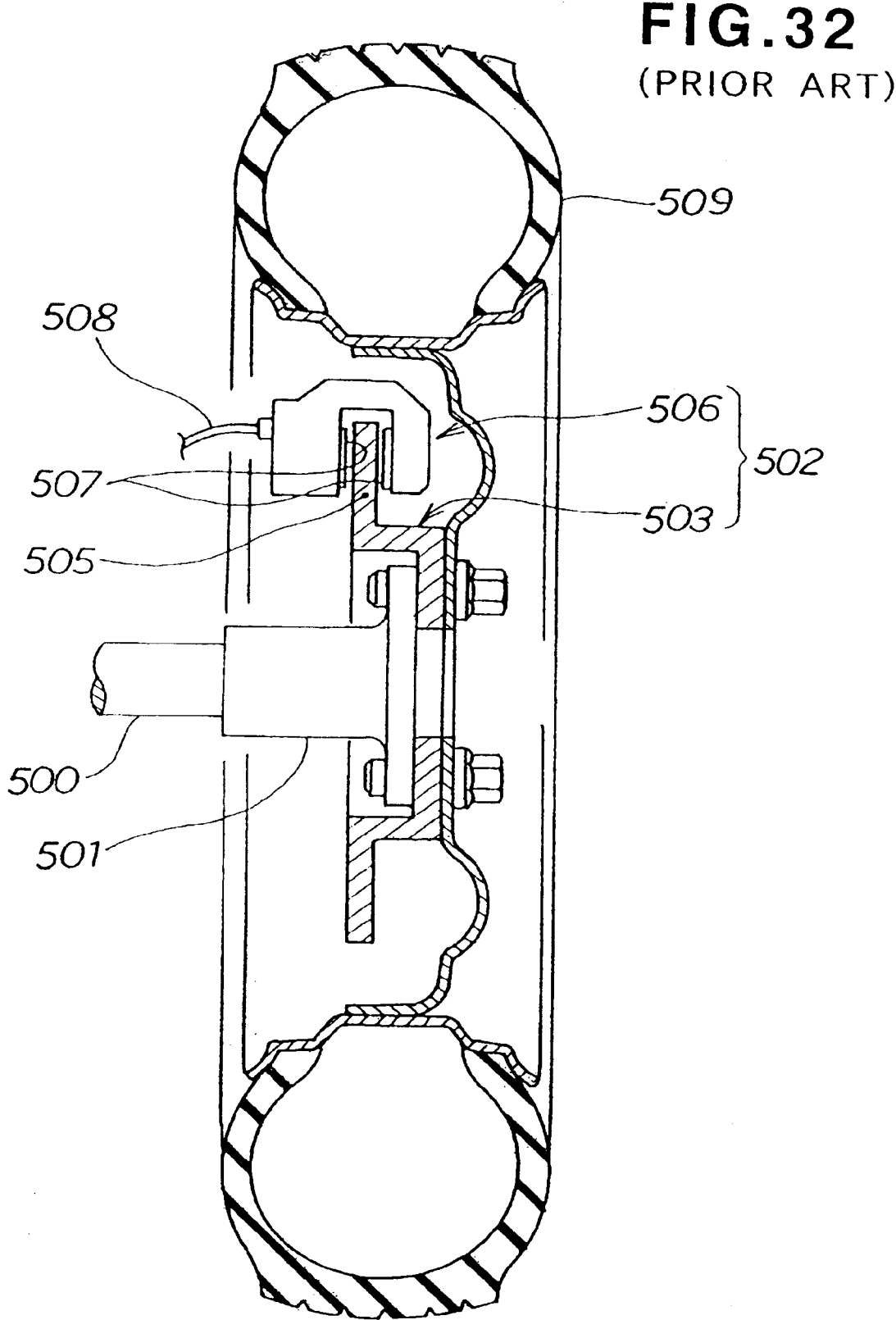
FIG. 32 is a cross sectional view of a typical conventional disk brake for motor vehicles.
Figure 33:
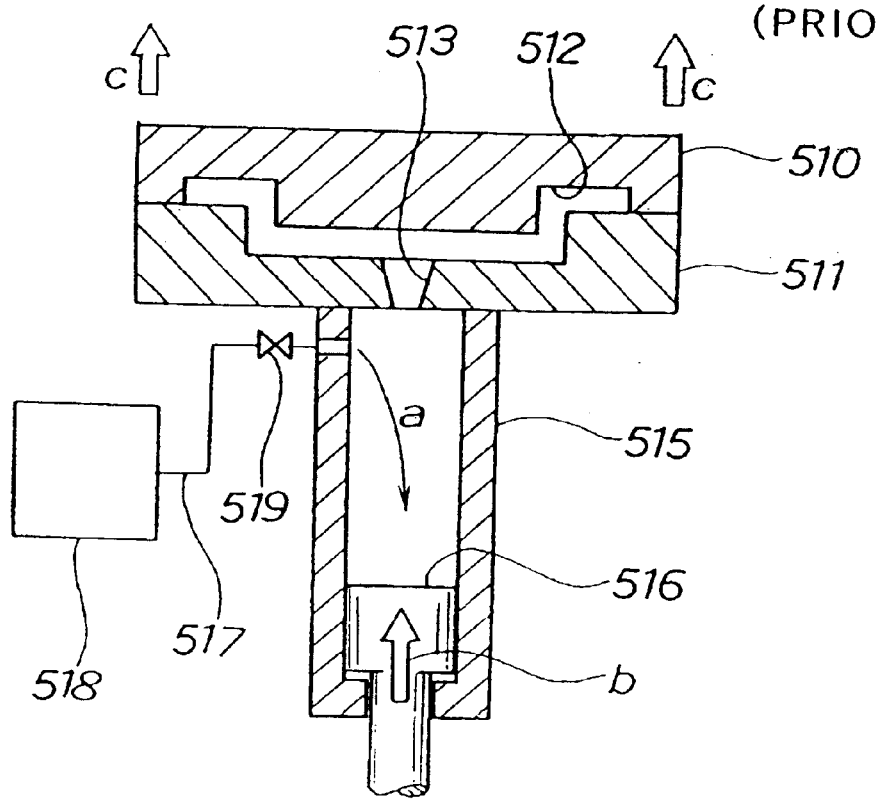
FIG. 33 is a cross sectional view of a conventional injection molding apparatus for a metal matrix composite material.
Figure 34:
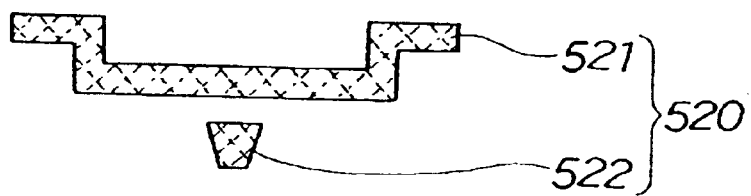
FIG. 34 is an explanatory views showing a cast product taken out from the die of the molding apparatus shown in FIG. 33.
Figure 35:
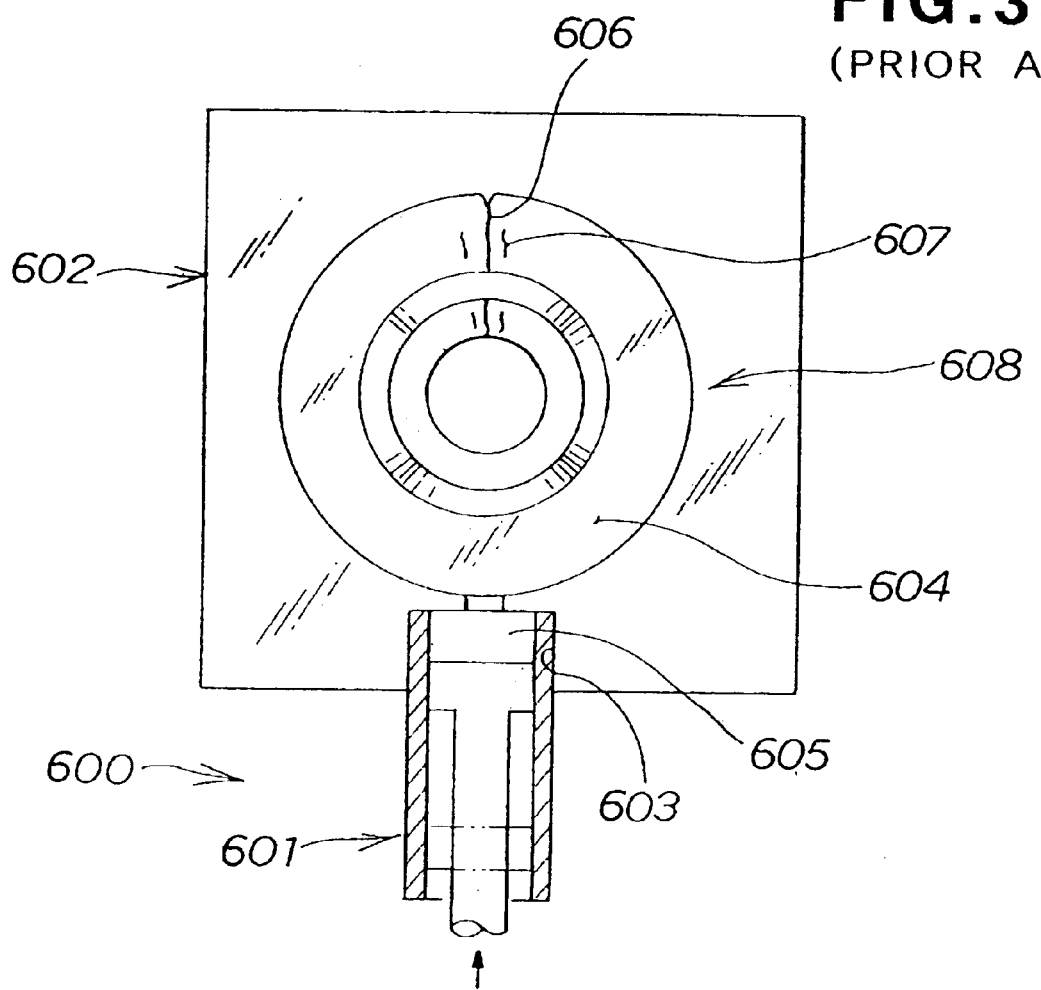
FIG. 35 is a schematic view showing a conventional injection molding apparatus.
Figure 36:
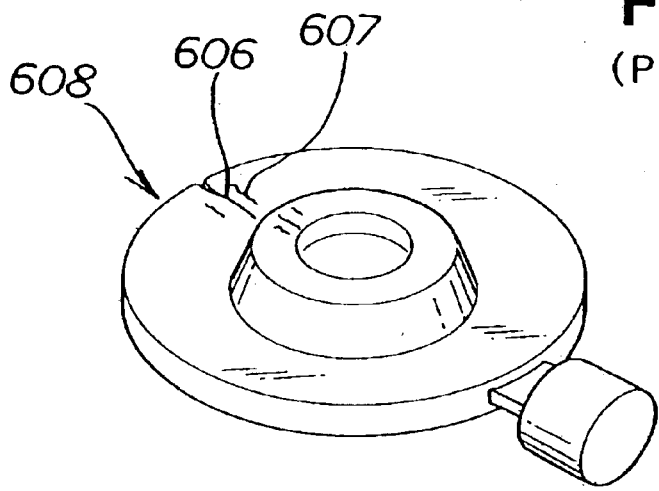
FIG. 36 is a perspective view of a disk rotor having casting defects produced by the apparatus of FIG. 35.

The injection apparatus 123 shown in FIG. 18 is shown in cross section in FIG. 30 in detail. The injection apparatus 123 comprises an injection cylinder 446 for storing a prescribed amount of the molten material upon reception thereof, a plunger 447 moving upward and downward in the injection cylinder 446 for pushing the molten material out, and a block 448 detachably mounted on the plunger 447.

The injection cylinder 446 comprises an inner wall surface 452 defined by the prescribed inner diameter D1.

The plunger 447 comprises a head portion 453 in slide contact with the inner wall surface 452 of the injection cylinder 446. The head portion 453 comprises a pushing surface 454 for pushing the molten material on the upper surface thereof, and a trapezoid projection 455 projecting upward for supporting the block 448.

The block 448 comprises an upper surface 461, the outer peripheral surface 462, and a lower surface 463. The lower surface 463 is formed with a tapered recess 464. The outer diameter of the block 448 is represented by D2. The outer diameter D2 is determined to be smaller than the inner diameter D1 of the injection cylinder 446, so that a prescribed clearance S is formed. More specifically, the outer diameter D2 has a relation D2=D1−2×S, and determined to be small so as not to come into contact with residue attached on the inner wall surface 452 of the injection cylinder 446.

Referring now to FIG. 31A to FIG. 31H, the operation of the injection apparatus according to the present invention will be described.

In FIG. 31A, the molten metal matrix composite material 424 is fed to the injection cylinder 446 of the injection apparatus 123 by the molten material feeding apparatus 115 (See FIG. 18). This feeding operation generates a slug 466 in the molten metal matrix composite material 424. The slug 466 is a residue 467 generated from an oxide of the molten metal matrix composite material 424, which is generated in the surface layer portion 468 of the molten material 424 and is attached on the inner wall surface 452 of the injection cylinder 446.

After the molten material 424 is fed, the injection cylinder 446 is moved upward as shown by the arrow (5), so that the upper end surface of the injection cylinder 446 is brought into intimate contact with the injection interface 441 of the die 414 as shown by a phantom line.

In FIG. 31B, after the injection cylinder 446 is fitted in the die 414, the injection starts. In other words, when the plunger 447 in the injection cylinder 446 is moved upward as shown by the arrow (6) to push the molten material 424 out, the molten material 424 is forced into the cross gate 438 and the cavity 437.

In FIG. 31C, when the plunger 447 is moved further upward to continue injection of the molten material 424, the plunger 447 moves upward while scraping the residue 467 adhered to the inner wall surface 452 of the injection cylinder 446. However, since the block 448 has a small diameter so that it does not brought into contact with the residue 467 adhered to the inner wall surface 452 of the injection cylinder 446, the residue 467 is not scraped. As a consequent, the block 448 can push the center portion of the molten material 424 that has no residue 467 therein. The residue 467 scraped by the plunger 447 stays in the clearance S, so that it is not mixed in the center portion of the molten material 424.

In FIG. 31D, when the plunger 447 reaches a prescribed stroke and injection of the molten material 424 is completed, the scraped residue 467 stays in the injection cylinder 446 and stops at the position near the cross gate 438. Therefore, it is not flown into the cavity 437.

After the molten material 424 is solidified, the plunger 447 is lowered as shown by the arrow (7). Since the block 448 is detachably placed on the head portion 453 of the plunger 447, when the plunger 447 moves downward, the block 448 is easily separated from the plunger 447, and the block 448 stays at the portion 472 of the cast product 471 corresponding to the gate.

In FIG. 31E, in order to take the cast product 471 out from the die 414, the injection apparatus 123 is moved downward as shown by the arrow (8), and then the movable die 432 of the die 414 is moved in the direction shown by the arrow (9) to open.

In FIG. 31F, the portion 472 of the cast product 471 corresponding to the gate is hit by the hammer 480 or the like to remove the block 448 from the portion 472 of the cast product corresponding to the gate. The hardness of the block 448 is higher than that of metal matrix composite material after it is solidified, no deformation or scratch is occurred even when an impact is applied to the block 448.

FIG. 31G shows a block 448 that is just taken out from the die. Since the block 448 has no deformation or scratch, it can be used repeatedly, thereby reducing the production cost.

In FIG. 31H, the block 448 is placed again on the head portion 453 of the plunger 447 of the injection apparatus 123. In this case, since the recess 464 of the block 448 is fitted on the projection 455 of the head portion 453, the block 448 can precisely positioned thereon and thus the clearance S can be established.

In the injection apparatus of the present invention, the example in which the block 448 is placed on the plunger 447 shown in FIG. 30 is shown as an embodiment. However, the plunger 447 and the block 448 may be integrally formed.

While the projection 455 of the plunger 447 is fitted with the recess 464 of the block 448, it is not limited to the projection 455 and the recess 464. It may be the hole and the pin to be fitted.

The configuration of the cavity 437 of the die 414 is just shown as an example, and thus it is not limited thereto in the present invention.

Obviously, various minor changes and modifications of the present invention are possible in the light of the above teaching. It is therefore to be understood that within the scope of the appended claims, the invention may be practiced otherwise than as specifically described.

What is claimed is:

1. A method for injection molding a metallic material in which an injecting material comprised of a half-solidified metallic material or a molten metallic material is injected into a cavity of a die from an injection cylinder through a gate thereof, said method comprising the steps of:

taking out a cast product from said die while said cast product is still hot, said cast product having a product portion molded in said cavity and a non-product portion remaining at said gate;

separating said non-product portion from said cast product while said non-product portion is in a state of high temperature;

shaping said high-temperature non-product portion into a billet;

putting said billet into said injection cylinder; and filling the injecting material into said injection cylinder to cause said billet to melt into the injecting material to thereby ready the billet for a succeeding injection cycle.

2. A method for injection molding a metallic material, as set forth in claim 1, wherein said step of taking out is carried out while said cast product is held at a temperature of 400 to 100° C.

3. A method for injection molding a metallic material, as set forth in claim 1, further comprising the steps of:

preparing a metallic material in a half-solidified state and a metal matrix composite material in a molten state for serving as the injecting material;

filling said metallic and metal matrix composite materials into said injection cylinder such that said metallic material is positioned closely to a plunger of said injection cylinder and said metal matrix composite material is positioned closely to said gate, so that said materials are injected into said cavity in a sequence of said metal matrix composite material and said metallic material.

4. A method for injection molding a metallic material, as set forth in claim 1, wherein said high-temperature non-product portion is disposed in said injection cylinder so that said non-product portion is press-formed into said billet in said injection cylinder.

5. A method for injection molding a metallic material, as set forth in claim 4, wherein said non-product portion is press-formed at a temperature of 400 to 100° C.

* * * * *